United States Patent
Kaji

(10) Patent No.: US 11,074,715 B2
(45) Date of Patent: Jul. 27, 2021

(54) IMAGE PROCESSING APPARATUS AND METHOD

(71) Applicant: SONY CORPORATION, Tokyo (JP)

(72) Inventor: Yohsuke Kaji, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,958

(22) PCT Filed: Mar. 14, 2017

(86) PCT No.: PCT/JP2017/010107
§ 371 (c)(1),
(2) Date: Jul. 13, 2018

(87) PCT Pub. No.: WO2017/169723
PCT Pub. Date: Oct. 5, 2017

(65) Prior Publication Data
US 2019/0035109 A1    Jan. 31, 2019

(30) Foreign Application Priority Data
Mar. 28, 2016 (JP) .............................. JP2016-064075

(51) Int. Cl.
*G06T 7/73* (2017.01)
*G06K 9/46* (2006.01)
(Continued)

(52) U.S. Cl.
CPC .............. *G06T 7/74* (2017.01); *G06K 9/2018* (2013.01); *G06K 9/3275* (2013.01);
(Continued)

(58) Field of Classification Search
CPC ...... H04N 5/74; H04N 9/3147; H04N 9/3194; G06T 7/74; G06T 2207/20224
(Continued)

(56) References Cited

U.S. PATENT DOCUMENTS

| 2008/0062164 A1* | 3/2008 | Bassi | .................. H04N 9/3194 345/214 |
| 2015/0319415 A1* | 11/2015 | Hara | ...................... G01M 11/02 356/121 |

FOREIGN PATENT DOCUMENTS

| JP | 2008-113416 A | 5/2008 |
| JP | 2014-178393 A | 9/2014 |
| JP | 2015-171077 A | 9/2015 |

OTHER PUBLICATIONS

Raskar et al., The Office of the Future: A Unified Approach to Image-Based Modeling and Spatially Immersive Displays, SIGGRAPH 98, Computer Graphics Proceedings, Annual Conference Series, 1998, Jul. 19-24, 1998, pp. 1-10, Orlando, Florida.
(Continued)

*Primary Examiner* — John W Miller
*Assistant Examiner* — Sihar A Karwan
(74) *Attorney, Agent, or Firm* — Paratus Law Group, PLLC

(57) ABSTRACT

There is provided an image processing apparatus and method that can improve accuracy of corresponding point detection. A plurality of predetermined feature points included in a captured image obtained by capturing a projected image including the feature points are detected, a single or a plurality of dots included in a captured image obtained by capturing a projected image including a dot pattern including the dots are detected, and corresponding points between the projected image and the captured image are detected by identifying the detected feature points on the basis of an appearance pattern of the detected dots in a time direction corresponding to the feature points. The present disclosure can be applied to, for example, an image processing apparatus, a projection apparatus, an imaging apparatus, a projection imaging apparatus, a control apparatus, a projection imaging system, or the like.

22 Claims, 25 Drawing Sheets

(51) Int. Cl.
   *G06K 9/32* (2006.01)
   *G06K 9/20* (2006.01)
   *G06T 7/33* (2017.01)
   *H04N 9/31* (2006.01)

(52) U.S. Cl.
   CPC .............. *G06K 9/4671* (2013.01); *G06T 7/33* (2017.01); *H04N 9/3147* (2013.01); *H04N 9/3185* (2013.01); *H04N 9/3194* (2013.01); *G06T 2207/10152* (2013.01); *G06T 2207/20224* (2013.01)

(58) Field of Classification Search
   USPC ....................................................... 345/214
   See application file for complete search history.

(56) References Cited

OTHER PUBLICATIONS

Raskar et al., iLamps: Geometrically Aware and Self-Configuring Projectors, Appears in ACM SIGGRAPH 2003 Conference Proceedings, Jul. 2003, pp. 1-10.

* cited by examiner

IMAGE PROCESSING APPARATUS AND METHOD

CROSS REFERENCE TO PRIOR APPLICATION

This application is a National Stage Patent Application of PCT International Patent Application No. PCT/JP2017/010107 (filed on Mar. 14, 2017) under 35 U.S.C. § 371, which claims priority to Japanese Patent Application No. 2016-064075 (filed on Mar. 28, 2016), which are all hereby incorporated by reference in their entirety.

TECHNICAL FIELD

The present disclosure relates to image processing apparatus and method, and particularly, to image processing apparatus and method that can improve accuracy of corresponding point detection.

BACKGROUND ART

In the past, to reduce distortion of a projected image projected by a projector or to adjust positions of projected images projected by a plurality of projectors, there has been a method of using a camera to capture a projected image and using the captured image to perform geometric correction of the projected image according to the position and the orientation of the projector, the shape of the projection surface, and the like. In a case of the method, corresponding points need to be obtained between the projected image and the captured image.

For example, a system of embedding a Gray code in a projected image (for example, see NPL 1) is proposed as online sensing that is a technique of obtaining corresponding points of an image of content or the like while projecting the image. In addition, there can also be a method of using a checkered pattern to obtain corresponding points using fewer images (for example, see NPL 2).

CITATION LIST

Non Patent Literature

[NPL 1]
Imperceptible Structured Light, Ramesh Raskar, SIGGRAPH 98
[NPL 2]
Ramesh Raskar, Jeroen van Baar, Paul Beardsley, Thomas Willwacher, Srinivas Rao, Clifton Forlines, "iLamps: Geometrically Aware and Self-Configuring Projectors," Appears in ACM SIGGRAPH 2003 Conference Proceedings, http://web.media.mit.edu/~raskar/Sig03/raskarILampsSiggraph03.pdf

SUMMARY

Technical Problems

However, the Gray code in principle can acquire only corresponding points at integer-pixel accuracy, and the accuracy is insufficient. In addition, in the case of the method of using the checkered pattern, it is difficult to identify each section of the pattern, and the corresponding points can be detected at fewer parts. Therefore, the accuracy of the corresponding point detection may be reduced.

The present disclosure has been made in view of the circumstances, and the present disclosure can improve accuracy of corresponding point detection.

Solution to Problems

An aspect of the present technique provides an image processing apparatus including a feature point detection unit that detects a plurality of predetermined feature points included in a captured image obtained by capturing a projected image including the feature points, a dot detection unit that detects a single or a plurality of dots included in a captured image obtained by capturing a projected image including a dot pattern including the dots, and a corresponding point detection unit that detects corresponding points between the projected image and the captured image by identifying the feature points detected by the feature point detection unit on the basis of an appearance pattern of the dots in a time direction detected by the dot detection unit and corresponding to the feature points.

The corresponding point detection unit can identify the feature points on the basis of an appearance pattern of the dots in the time direction detected by the dot detection unit and positioned at the same positions as or around the feature points detected by the feature point detection unit.

The projected image including the feature points can be a projected image of a checkered pattern, and the feature points can be corners of the checkered pattern.

The feature point detection unit can generate a difference image between a pair of captured images obtained by capturing projected images of a pair of checkered patterns with reversed patterns and detect the feature points included in the generated difference image.

The feature point detection unit can binarize the difference image to generate a binary image and detect the feature points included in the generated binary image.

The feature point detection unit can generate map information of coordinates of the detected feature points.

The dot detection unit can detect the dots included in each captured image obtained by capturing the projected image of each of a plurality of dot patterns provided with the dots arranged such that appearance patterns of the dots in the time direction sequentially projected in the time direction and corresponding to the feature points are uniquely determined.

The dot detection unit can detect the dots in predetermined ranges including the feature points.

The dot detection unit can generate a difference image between a captured image obtained by capturing a projected image not including the dot pattern and a captured image obtained by capturing a projected image including the dot pattern and detect the dots included in the generated difference image.

The dot detection unit can binarize the difference image to generate a binary image and detect the dots included in the generated binary image.

The dot detection unit can further detect centers of gravity of the detected dots, and the corresponding point detection unit can use the centers of gravity of the dots detected by the dot detection unit to correct the positions of the feature points.

The dot detection unit can detect the dots and the centers of gravity of the dots included in each captured image obtained by capturing the projected image of each of the plurality of dot patterns provided with the dots arranged such that the appearance patterns of the dots in the time direction sequentially projected in the time direction and corresponding to the feature points are uniquely determined and can average, in the time direction, the detected centers of gravity of the dots corresponding to the same feature points.

The dot pattern can be provided with the dots in a pattern such that a frequency of appearance of the dot in the time direction corresponding to the feature point in a peripheral section of the projected image is higher than a frequency of appearance of the dot in the time direction corresponding to the feature point at a position other than the peripheral section of the projected image.

The feature points can be parts of predetermined pictures included in a pattern image in which pictures in a predetermined pattern are repeated, the feature point detection unit can be configured to detect the feature points included in a captured image obtained by capturing a projected image including the pattern image superimposed on another image, and the dot detection unit can be configured to detect the dots included in a captured image obtained by capturing a projected image including the dot pattern superimposed on another image.

The corresponding point detection unit can detect corresponding points between each projected image projected from a plurality of projection units and each captured image obtained by a plurality of imaging units by capturing each projected image.

The image processing apparatus can further include an orientation estimation unit that uses the corresponding points detected by the corresponding point detection unit to estimate an orientation.

The image processing apparatus can further include a setting unit that performs setting regarding geometric correction of the projected image on the basis of the orientation estimated by the orientation estimation unit.

The image processing apparatus can further include a projection unit that projects the projected image.

The image processing apparatus can further include an imaging unit that captures the projected image to obtain the captured image.

An aspect of the present technique provides an image processing method including detecting a plurality of predetermined feature points included in a captured image obtained by capturing a projected image including the feature points, detecting a single or a plurality of dots included in a captured image obtained by capturing a projected image including a dot pattern including the dots, and detecting corresponding points between the projected image and the captured image by identifying the detected feature points on the basis of an appearance pattern of the detected dots in a time direction corresponding to the feature points.

In the image processing apparatus and method according to the aspects of the present technique, a plurality of predetermined feature points included in a captured image obtained by capturing a projected image including the feature points are detected, a single or a plurality of dots included in a captured image obtained by capturing a projected image including a dot pattern including the dots are detected, and corresponding points between the projected image and the captured image are detected by identifying the detected feature points on the basis of an appearance pattern of the detected dots in a time direction corresponding to the feature points.

Advantageous Effects of Invention

According to the present disclosure, an image can be processed. Particularly, accuracy of corresponding point detection can be improved.

DESCRIPTION OF EMBODIMENTS

Hereinafter, modes for carrying out the present disclosure (hereinafter, referred to as embodiments) will be described. Note that the description is in the following order.

1. Corresponding Point Detection and Geometric Correction
2. First Embodiment (Projection Imaging System)
3. Second Embodiment (Projection Imaging System and Projection Imaging Apparatus)
4. Etc.

1. Corresponding Point Detection and Geometric Correction

<Geometric Correction>

Figure 1:
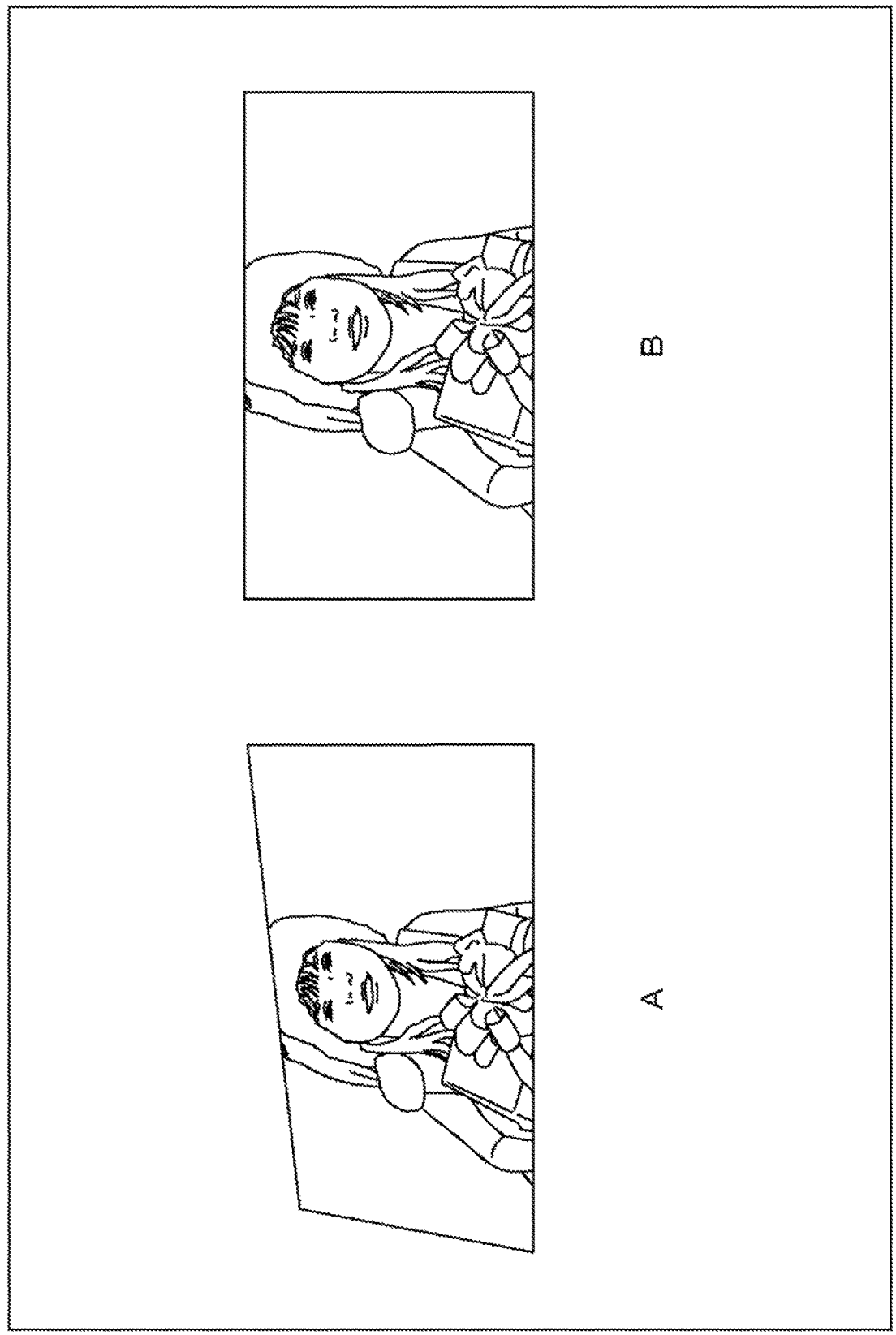
FIG. 1 is a diagram illustrating an example of a situation of geometric correction.

Depending on the orientation (such as the position and the direction) of a projector with respect to a projection surface (such as a screen and a wall), the shape of the projection surface, or the like, there is a case where an image projected on the projection surface (also referred to as projected image) is distorted and hard to see as illustrated for example in A of FIG. 1. In such a case, geometric correction, such as correction of distortion, can be applied to the image projected by the projector to reduce the distortion of the projected image to facilitate to view the projected image as in an example of B in FIG. 1.

Figure 2:
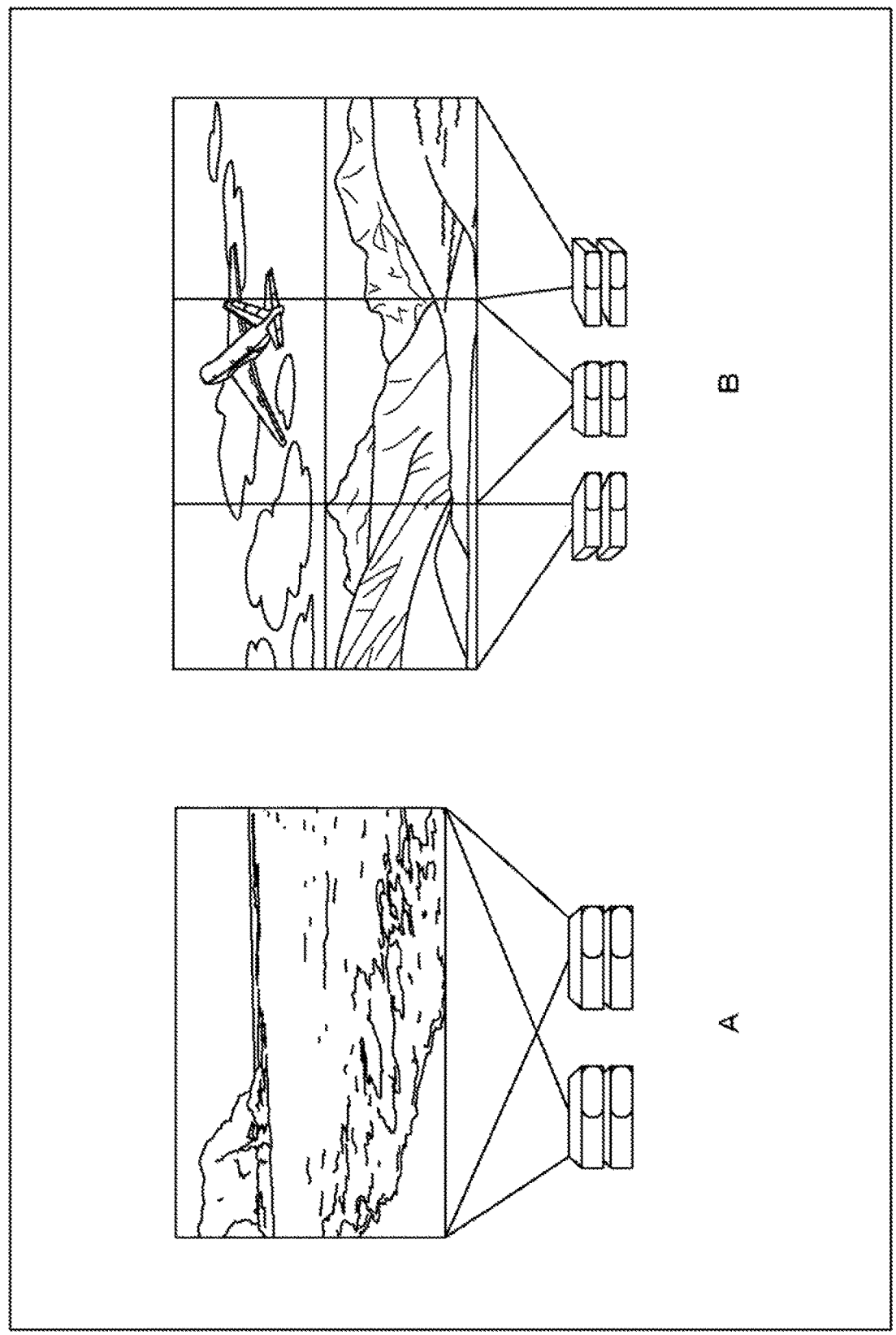
FIG. 2 is a diagram illustrating an example of a situation of geometric correction.

In addition, there is a system in which a plurality of projectors project images to form one projected image as in an example of FIG. 2. For example, there is a method in which a plurality of projectors project images to the same position to increase the contrast ratio to realize a high dynamic range as in A of FIG. 2. In addition, for example, there is a method of lining up projected images projected from the projectors to realize a projected image larger than the projected image projected by one projector (projected image with higher resolution than the projected image projected by one projector) as in B of FIG. 2. In the cases of the methods, if the positional relationship between the projected images projected from the projectors is inappropriate, the image quality of the entire projected image may be reduced due to deviation and overlapping of the projected images or an unnecessary gap between the projected images. Therefore, not only the distortion correction of each projected image, but also geometric correction such as position adjustment of the projected images is necessary in some cases.

Figure 3:
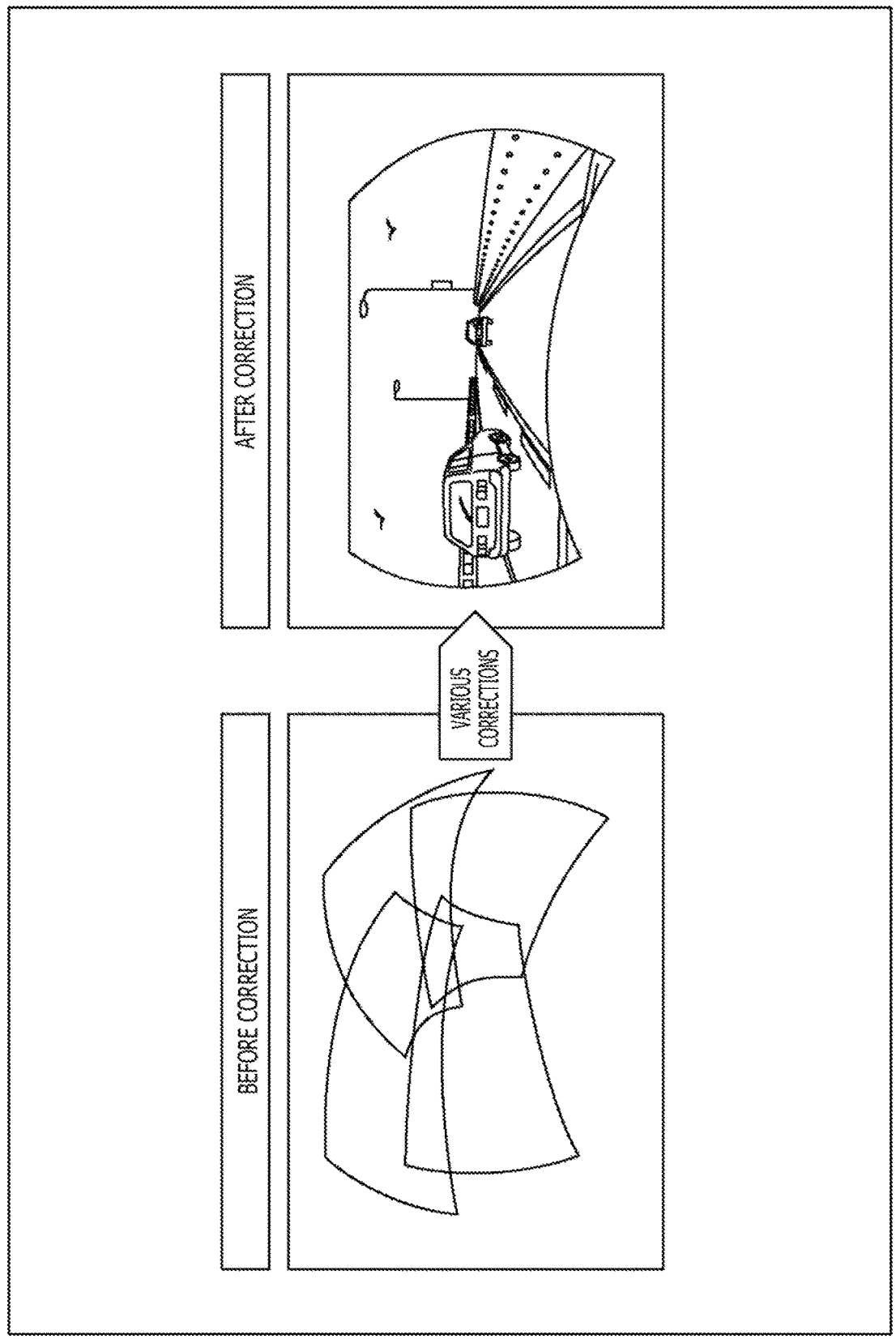
FIG. 3 is a diagram illustrating an example of a situation of geometric correction.

By performing the geometric correction of the images to be projected, the images can be projected as one image even in a case where the images are projected from a plurality of projectors to a curved projection surface as in an example of FIG. 3. Note that in the case of lining up the plurality of projected images to form a large projected image as in the examples of B of FIG. 2 and FIG. 3, parts of adjacent projected images can be superimposed (overlapped) to more easily adjust the positions (for example, FIG. 3).

Although an operator or the like who operates the projectors can manually perform the geometric correction, complicated work may be necessary. Therefore, there can be a method of using a camera to capture the projected images projected by the projectors and using the captured images to perform the geometric correction.

In that case, corresponding points (corresponding pixels of the projected image and the captured image at the same positions on the projection surface) need to be obtained between the projected image (may be the image to be projected) and the captured image. That is, the correspondence between the pixels of the camera and the pixels of the projector needs to be obtained. In the case where a plurality of projectors are used as in FIGS. 2 and 3 for example, the positional relationship between the projected images also needs to be obtained. That is, the correspondence between the pixels of the cameras and the pixels of the projectors also needs to be obtained between projection imaging apparatuses.

Figure 4:
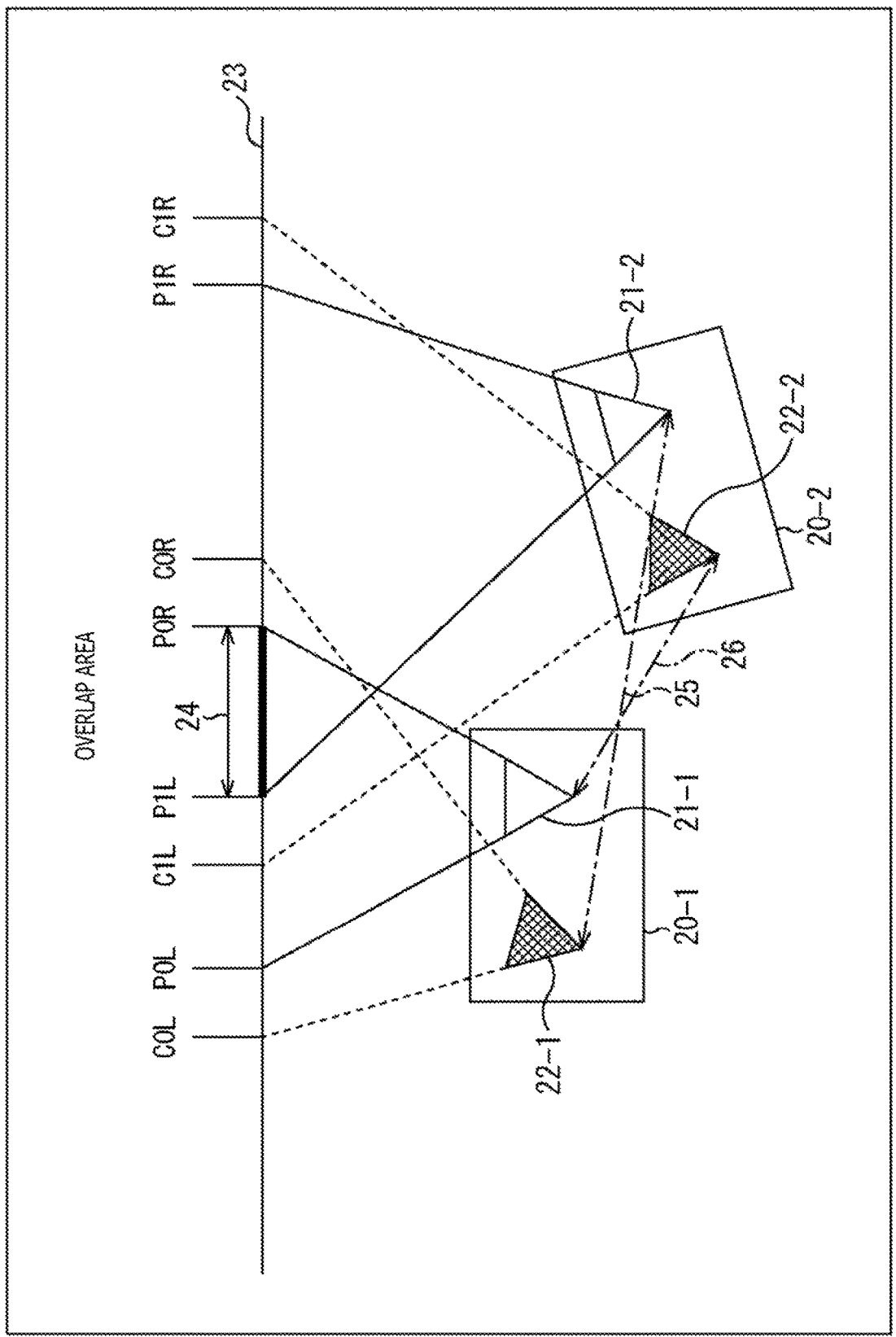
FIG. 4 is a diagram illustrating an example of a situation of corresponding point detection.

For example, as in FIG. 4, it is assumed that a projection imaging apparatus 20-1 including a projection unit 21-1 (projector) and an imaging unit 22-1 (camera) and a projection imaging apparatus 20-2 including a projection unit 21-2 (projector) and an imaging unit 22-2 (camera) cooperate to project an image. Here, the projection imaging apparatus 20-1 and the projection imaging apparatus 20-2 will be referred to as projection imaging apparatuses 20 in a case where the distinction is not necessary in the description. In addition, the projection unit 21-1 and the projection unit 21-2 will be referred to as projection units 21 in a case where the distinction is not necessary in the description. Furthermore, the imaging unit 22-1 and the imaging unit 22-2 will be referred to as imaging units 22 in a case where the distinction is not necessary in the description.

As illustrated in FIG. 4, a projection area of a projection surface 23 (range of projected image) for the projection by the projection unit 21-1 of the projection imaging apparatus 20-1 is a range of P0L to P0R. In addition, a projection area of the projection surface 23 for the projection by the projection unit 21-2 of the projection imaging apparatus 20-2 is a range of P1L to P1R. That is, a range indicated by a double-headed arrow 24 (range of P1L to P0R) is an overlap area where the projected images overlap.

Note that an imaging area of the projection surface 23 (range included in the captured image) for the imaging by the imaging unit 22-1 of the projection imaging apparatus 20-1 is a range of C0L to C0R. In addition, an imaging area of the projection surface 23 (range included in the captured image) for the imaging by the imaging unit 22-2 of the projection imaging apparatus 20-2 is a range of C1L to C1R.

Figure 5:
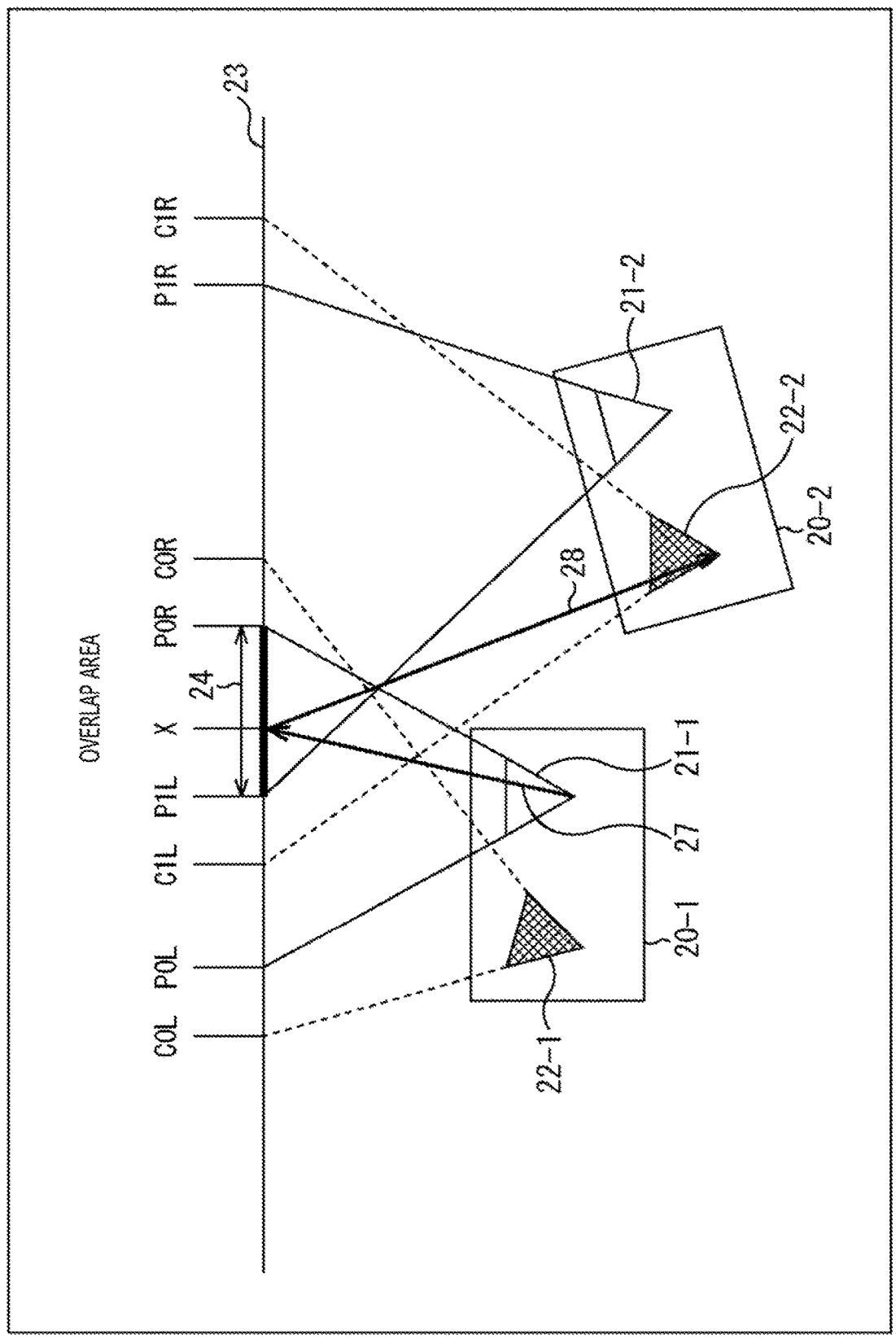
FIG. 5 is a diagram illustrating an example of a situation of corresponding point detection.

In the case of the system, not only the corresponding points between the projection unit 21 and the imaging unit 22 in each projection imaging apparatus 20 need to be obtained, but also the corresponding points between the projection units 21 and the imaging units 22 need to be obtained between the projection imaging apparatuses 20 in order to adjust the positions of the projected images as described above. Therefore, as illustrated for example in FIG. 5, light (arrow 27) emitted from a pixel of the projection unit 21-1 is reflected at X of the projection surface 23, and which pixel of the imaging unit 22-2 receives the light (arrow 28) is calculated. In addition, a similar pixel correspondence is also obtained between the projection unit 21-2 and the imaging unit 22-1.

In this way, the corresponding points are obtained between all the projection units 21 and the imaging units 22 in which the corresponding points can be obtained. As a result, the position of the overlap area (range indicated by the double-headed arrow 24) can be adjusted by the geometric correction.

<Online Sensing>

Although the corresponding point detection for the geometric correction can be performed before the start of the projection of a video, the corresponding points may be deviated by an effect of the temperature or a disturbance, such as vibration, during the projection of the video after the initial installation. If the corresponding points are deviated, the geometric correction becomes inappropriate. As a result, the projected image may be distorted, or the position may be deviated.

In such a case, the corresponding point detection needs to be performed again, and pausing the projection of the video for the detection is not preferable for the user watching the video (degree of satisfaction may be reduced). Therefore, there can be a method of detecting the corresponding points while the projection of the video is continued (online sensing).

Examples of the online sensing technique include a system using invisible light such as infrared, a system using an image feature amount such as SIFT, and an ISL (Imperceptible Structured Light) system. In the case of the system using the invisible light such as infrared, a projector (such as infrared projector) that projects the invisible light is further needed, and the cost may increase. In addition, in the case of the system using the image feature amount such as SIFT, the detection accuracy and the density of the corresponding points depend on the content of the image to be projected, and it is difficult to perform the corresponding point detection with stable accuracy.

On the other hand, visible light is used in the case of the ISL system, and an increase in the system configuration elements (that is, increase in the cost) can be suppressed. In addition, the corresponding point detection can be performed with stable accuracy independently from the image to be projected.

<ISL System>

In the ISL system, structured light patterns that are images in predetermined patterns are embedded in projected images, and the patterns are projected without being perceived by human beings. Then, the structured light patterns are used to detect the corresponding points.

Figure 6:
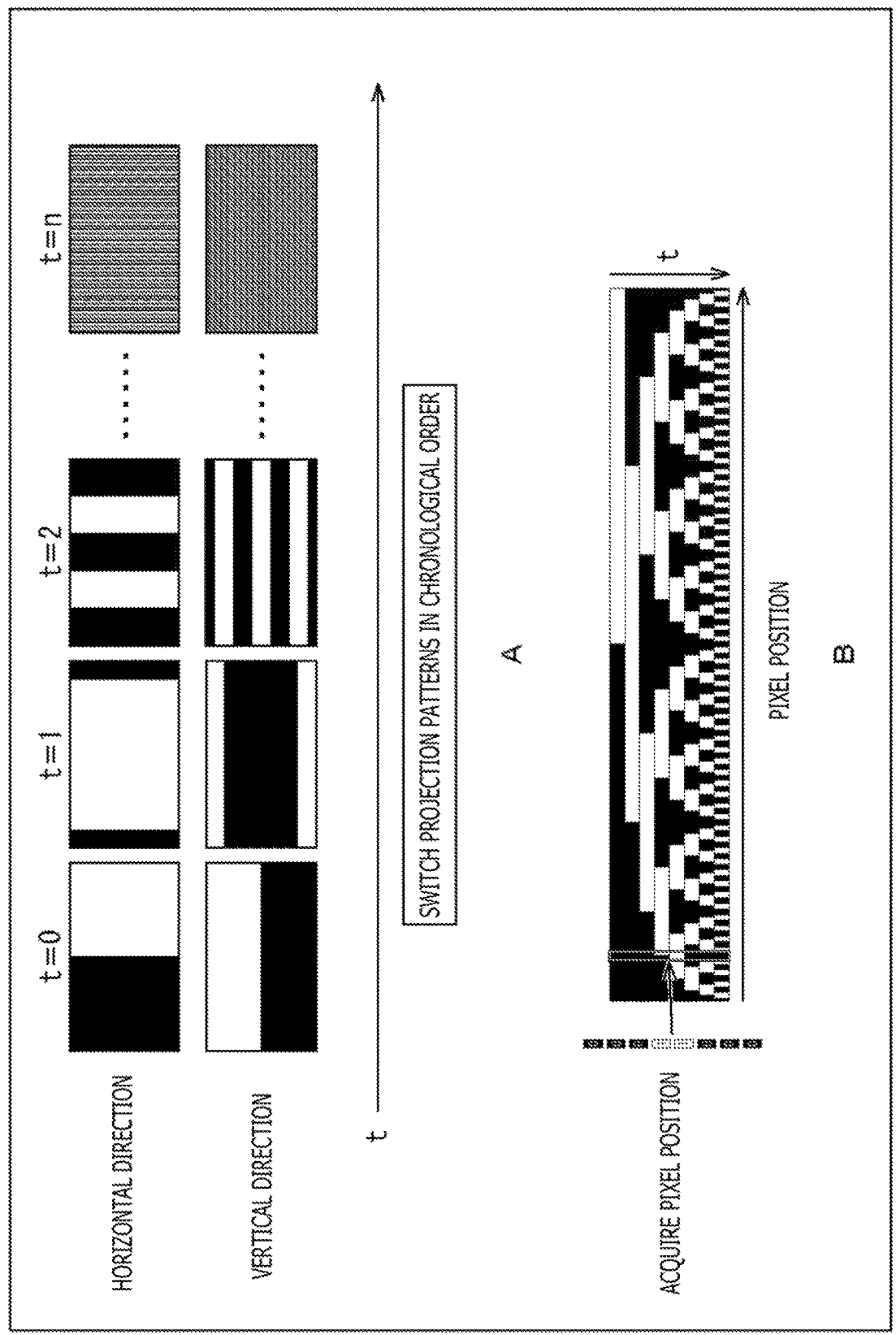
FIG. 6 is a diagram illustrating an example of a Gray code.

An example of the structured light patterns used in the ISL system includes a method of using a Gray code. For example, predetermined pattern images as illustrated in A of FIG. 6 are switched and projected in chronological order, and each pattern is imaged. Then, once the imaging of all patterns is completed, "1" (white) or "0" (black) of each imaging pattern is detected at each pixel of the captured image, and as illustrated in B of FIG. 6, the change pattern of "1" and "0" is decoded to acquire the positions of the projector pixels. As a result, the correspondence between the pixels can be acquired.

Figure 7:
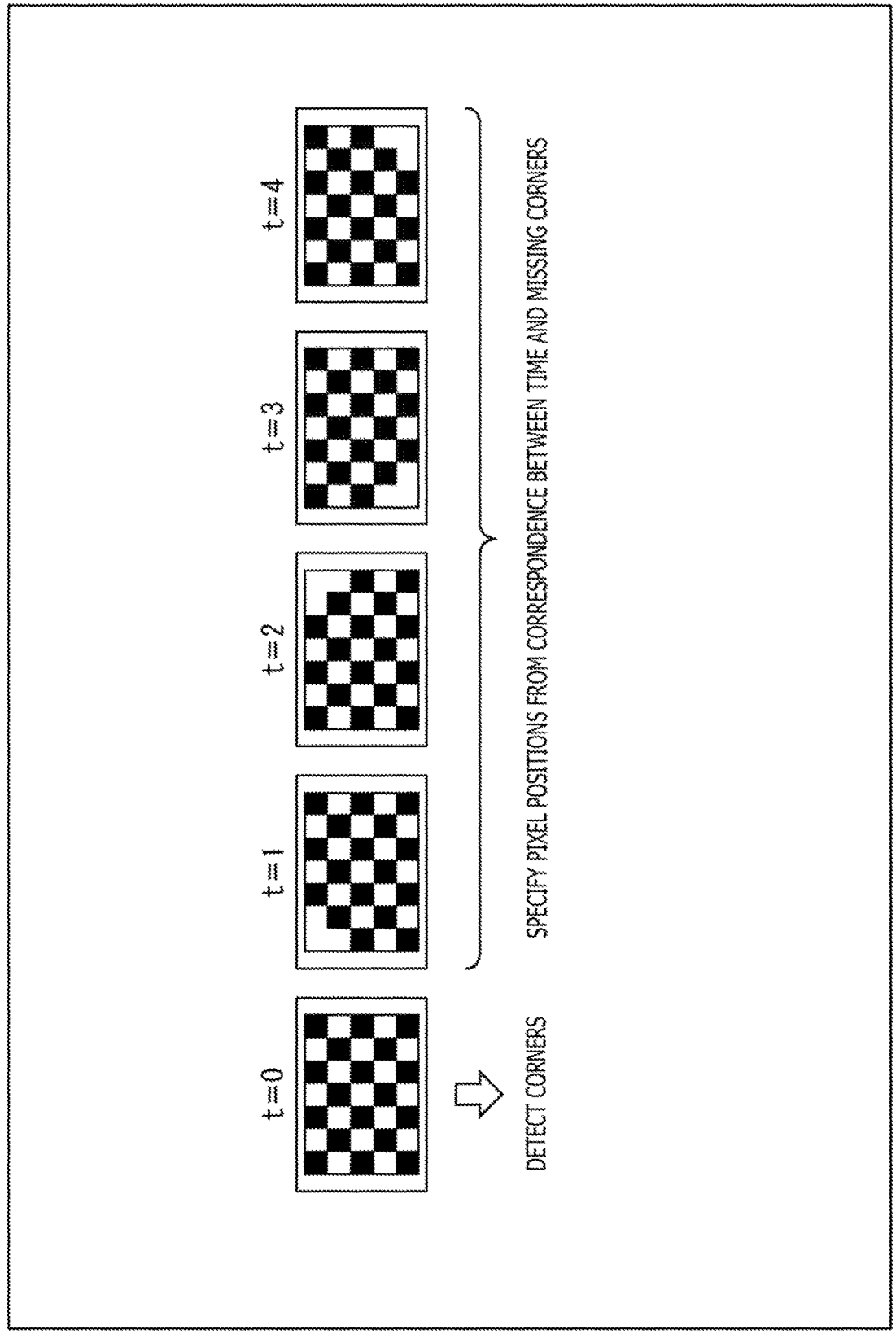
FIG. 7 is a diagram illustrating an example of checkered patterns.

There is also a method in which, for example, checkered patterns as illustrated in FIG. 7 are used as the structured light patterns. For example, one checkered pattern and four checkered patterns missing one of the four corners as illustrated in FIG. 7 are projected, and the projection order of the patterns and the information of the missing corners are adjusted to detect the correspondence between each corner of the checkered patterns and the pixel of the projector.

However, the Gray code in principle can acquire only corresponding points at integer-pixel accuracy, and the accuracy is insufficient. In addition, to identify each pixel of the projector by using the Gray code, a significantly large number of patterns, that is, ceil(log 2(horizontal resolution))+ceil(log 2(vertical resolution)), need to be projected.

In addition, although the method of using the checkered patterns can detect the corresponding points with fewer patterns than in the method of using the Gray code, the corresponding points can be obtained only at the corners with missing patterns. Therefore, for example, the projected image tends to be distorted, and the accuracy of the corresponding point detection is low. It may be difficult to obtain sufficient accuracy. Furthermore, at least one missing corner needs to be viewed from the camera in the method of using the checkered patterns, and the degree of freedom of the installation of the projector and the camera (degree of freedom of the position and the orientation) may be reduced.

<Identification of Corners of Checkered Patterns Using Dot Patterns>

Therefore, feature points included in a captured image obtained by imaging a projected image including a plurality of predetermined feature points are detected, and dots included in a captured image obtained by capturing a projected image including a dot pattern including a single or a plurality of dots are detected. On the basis of an appearance pattern of the detected dots in a time direction corresponding to the detected feature points, the feature points are identified to detect the corresponding points between the projected image and the captured image.

In this way, the accuracy of the corresponding point detection can be improved.

2. First Embodiment

<Projection Imaging System>

Figure 8:
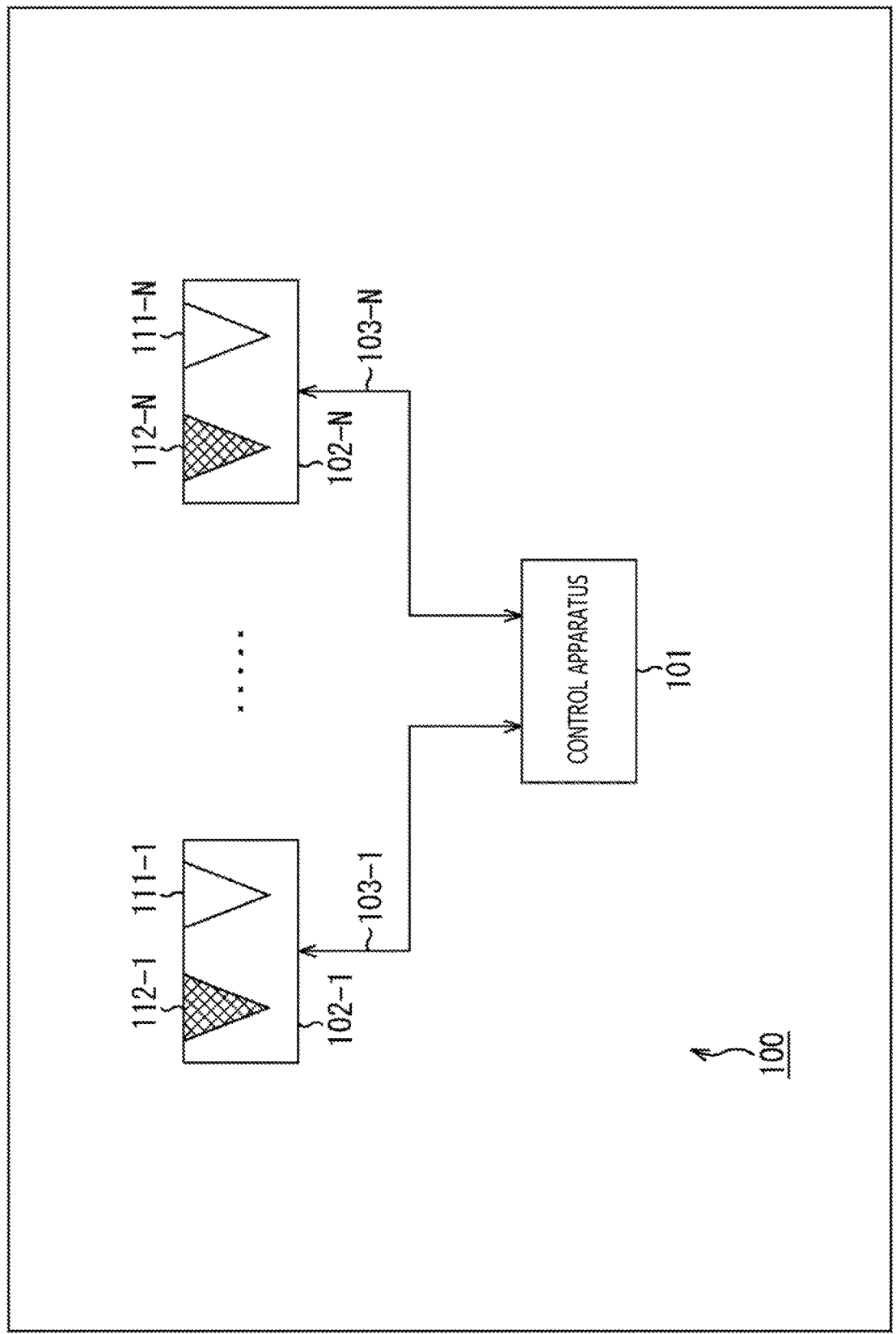
FIG. 8 is a block diagram illustrating a main configuration example of a projection imaging system.

FIG. 8 is a block diagram illustrating a main configuration example of an embodiment of a projection imaging system according to the present technique. In FIG. 8, a projection imaging system 100 is a system that can project an image, capture the projected image, and use a method according to the present technique to perform corresponding point detection on the basis of the ISL system.

As illustrated in FIG. 8, the projection imaging system 100 includes a control apparatus 101 and projection imaging apparatuses 102-1 to 102-N (N is an arbitrary natural number). The projection imaging apparatuses 102-1 to 102-N are connected to the control apparatus 101 through cables 103-1 to 103-N, respectively.

Hereinafter, the projection imaging apparatuses 102-1 to 102-N will be referred to as projection imaging apparatuses 102 in a case where the distinction is not necessary in the description. In addition, the cables 103-1 to 103-N will be referred to as cables 103 in a case where the distinction is not necessary in the description.

The control apparatus 101 controls each projection imaging apparatus 102 through the cable 103. For example, the control apparatus 101 supplies an image to be projected to each projection imaging apparatus 102 to cause the imaging apparatus 102 to project the image. In addition, for example, the control apparatus 101 instructs each projection imaging apparatus 102 to capture a projected image or the like and acquires the captured image. Furthermore, for example, the control apparatus 101 detects corresponding points between the projected image and the captured image. In addition, for example, the control apparatus 101 estimates the orientation of each projection imaging apparatus 102 on the basis of the obtained corresponding points, reconstructs the screen (projection surface), and applies geometric correction to the image to be projected by each projection imaging apparatus 102.

For example, the geometric correction applied by the control apparatus 101 to the image to be projected may be, for example, image processing, such as expansion, reduction, and deformation. In addition, for example, the geometric correction performed by the control apparatus 101 may be, for example, control or the like of a projection direction, an imaging direction, or the like of an optical system of each projection imaging apparatus 102. Obviously, both of them may be performed.

The projection imaging apparatuses 102-1 to 102-N include projection units 111-1 to 111-N that project images and imaging units 112-1 to 112-N that image an object, respectively. Hereinafter, the projection units 111-1 to 111-N will be referred to as projection units 111 in a case where the distinction is not necessary in the description. In addition, the imaging units 112-1 to 112-N will be referred to as imaging units 112 in a case where the distinction is not necessary in the description.

The projection unit 111 has a so-called projector function. That is, the projection imaging apparatus 102 can use the projection unit 111 to operate as a projector. For example, the projection imaging apparatus 102 can use the projection unit 111 to project an image supplied from the control apparatus 101 to an arbitrary projection surface.

The imaging unit 112 has a so-called camera function. That is, the projection imaging apparatus 102 can use the imaging unit 112 to operate as a camera. For example, the projection imaging apparatus 102 can use the imaging unit 112 to image the projection surface on which an image is projected by the projection unit 111. Note that the projection imaging apparatus 102 further includes a function of communicating with the control apparatus 101. For example, the projection imaging apparatus 102 can use the communication function to supply data of the captured image obtained by the imaging unit 112 to the control apparatus 101.

The number of projection imaging apparatuses 102 is arbitrary, and there may be a single or a plurality of projection imaging apparatuses 102. In the case where there are a plurality of projection imaging apparatuses 102, the projection imaging apparatuses 102 can operate independently from each other or can cooperate with each other under the control of the control apparatus 101 to project the images as described with reference to FIGS. 2 and 3. The projection imaging system 100 in the case where the projection imaging apparatuses 102 cooperate functions as a so-called multi-projection system and can realize so-called projection mapping.

Note that parameters of the projection unit 111 regarding the projection, such as, for example, the projection direction and the expansion rate of the image and the distortion correction of the projected image, may be able to be controlled. In addition, for example, the position and the orientation of the optical system included in the projection unit 111, the position and the orientation of the entire projection unit 111, and the like may be able to be controlled to control the parameters regarding the projection.

In addition, parameters of the imaging unit 112 regarding the imaging, such as, for example, the imaging direction and the angle of view of the image and the distortion correction of the captured image, may be able to be controlled. In addition, for example, the position and the orientation of the optical system included in the imaging unit 112, the position and the orientation of the entire imaging unit 112, and the like may be able to be controlled to control the parameters regarding the imaging.

Furthermore, the control of the projection unit 111 and the control of the imaging unit 112 may be able to be performed independently from each other. In addition, the position and the orientation of the projection imaging apparatus 102 may be able to be controlled. Note that the control of the projection unit 111, the control of the imaging unit 112, and the control of the projection imaging apparatus 102 may be performed by the control apparatus 101 or may be performed by, for example, an apparatus other than the control apparatus 101, such as the projection imaging apparatus 102.

The cable 103 is a telecommunication cable of an arbitrary standard that connects the control apparatus 101 and the projection imaging apparatus 102 to allow communication. That is, the cable 103 can be a communication medium between the control apparatus 101 and the projection imaging apparatus 102. Note that in the projection imaging system 100, it is only necessary that the control apparatus 101 and the projection imaging apparatus 102 be connected to each other and capable of communicating with each other, and for example, the control apparatus 101 and the projection imaging apparatus 102 may be connected through wireless communication. In that case, the cable 103 may be eliminated.

As described above, the control apparatus 101 detects the corresponding points between the projected image and the captured image. That is, the control apparatus 101 obtains the pixel correspondence between each projection unit 111 and each imaging unit 112. In this case, the control apparatus 101 performs the corresponding point detection on the basis of the ISL system of online sensing. In this case, the control apparatus 101 uses the method according to the present technique to perform the corresponding point detection.

<Control Apparatus>

Figure 9:
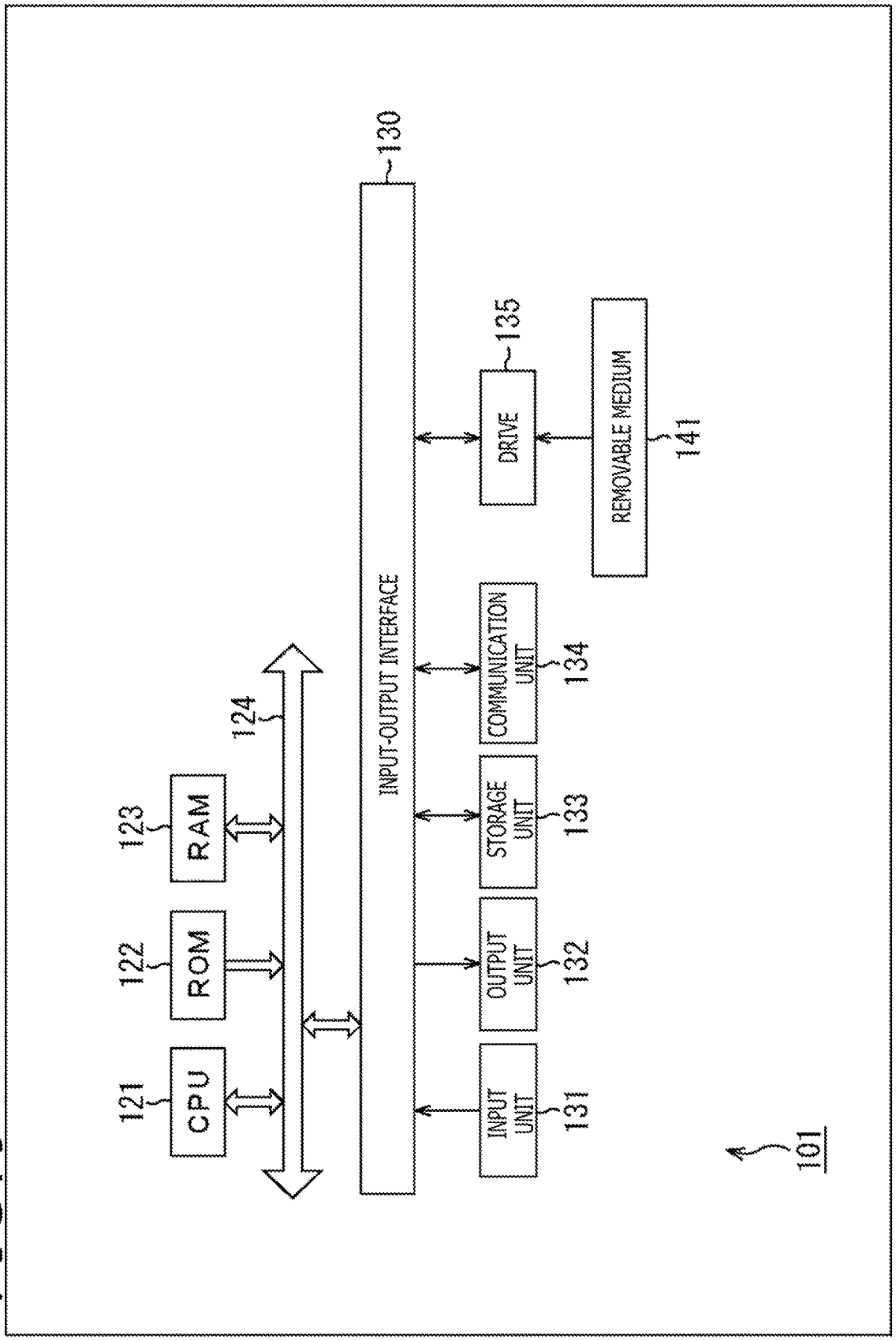
FIG. 9 is a block diagram illustrating a main configuration example of a control apparatus.

FIG. 9 is a block diagram illustrating a main configuration example of the control apparatus 101 as an embodiment of the image processing apparatus according to the present technique.

As illustrated in FIG. 9, the control apparatus 101 includes a CPU 121, a ROM 122, a RAM 123, a bus 124, an input-output interface 130, an input unit 131, an output unit 132, a storage unit 133, a communication unit 134, and a drive 135.

The CPU 121, the ROM 122, and the RAM 123 are connected to each other through the bus 124. The input-output interface 130 is also connected to the bus 124. The input unit 131, the output unit 132, the storage unit 133, the communication unit 134, and the drive 135 are connected to the input-output interface 130.

The CPU 121 loads programs or the like stored in, for example, the ROM 122 or the storage unit 133 to the RAM 123 and executes the programs or the like to execute various processes. Data and the like necessary for the CPU 121 to execute various processes are also appropriately stored in the RAM 123.

For example, the CPU 121 can execute the programs or the like in this way to execute processes regarding the detection of the corresponding points.

The input unit 131 includes, for example, an input device that receives arbitrary external information such as a user input. The input device may be any device. For example, the input device may be a keyboard, a mouse, an operation button, a touch panel, a camera, a microphone, a barcode reader, or the like. The input device may also be various sensors, such as an accelerator sensor, an optical sensor, and a temperature sensor. Furthermore, the input device may be an input terminal that receives data (signal) of arbitrary external information. The output unit 132 includes, for example, an output device that outputs arbitrary information inside of the apparatus, such as an image and sound. The output device may be any device. For example, the output device may be a display, a speaker, or the like. The output device may also be an output terminal that outputs data (signal) of arbitrary information to the outside.

The storage unit 133 includes a storage medium that stores information, such as programs and data. The storage medium may be any medium. For example, the storage medium may be a hard disk, a RAM disk, a non-volatile memory, or the like. The communication unit 134 includes a communication device that communicates with an external apparatus to transmit and receive information, such as programs and data, through a predetermined communication medium (for example, arbitrary network such as the Internet). The communication device may be any device. For example, the communication device may be a network interface. The communication method and the communication standard of the communication by the communication unit 134 are arbitrary. For example, the communication unit 134 may be able to perform wired communication, may be able to perform wireless communication, or may be able to perform both of them.

The drive 135 executes a process regarding reading and writing of information (program, data, or the like) to a removable medium 141 mounted on the drive 135. The removable medium 141 may be any recording medium. For example, the removable medium 141 may be a magnetic disk, an optical disk, a magneto-optical disk, a semiconductor memory, or the like. For example, the drive 135 reads the information (program, data, or the like) stored in the removable medium 141 mounted on the drive 135 and supplies the information to the CPU 121, the RAM 123, or the like. In addition, for example, the drive 135 acquires information (program, data, or the like) supplied from the CPU 121, the RAM 123, or the like and writes the information to the removable medium 141 mounted on the drive 135.

<Functional Blocks of Control Apparatus>

Figure 10:
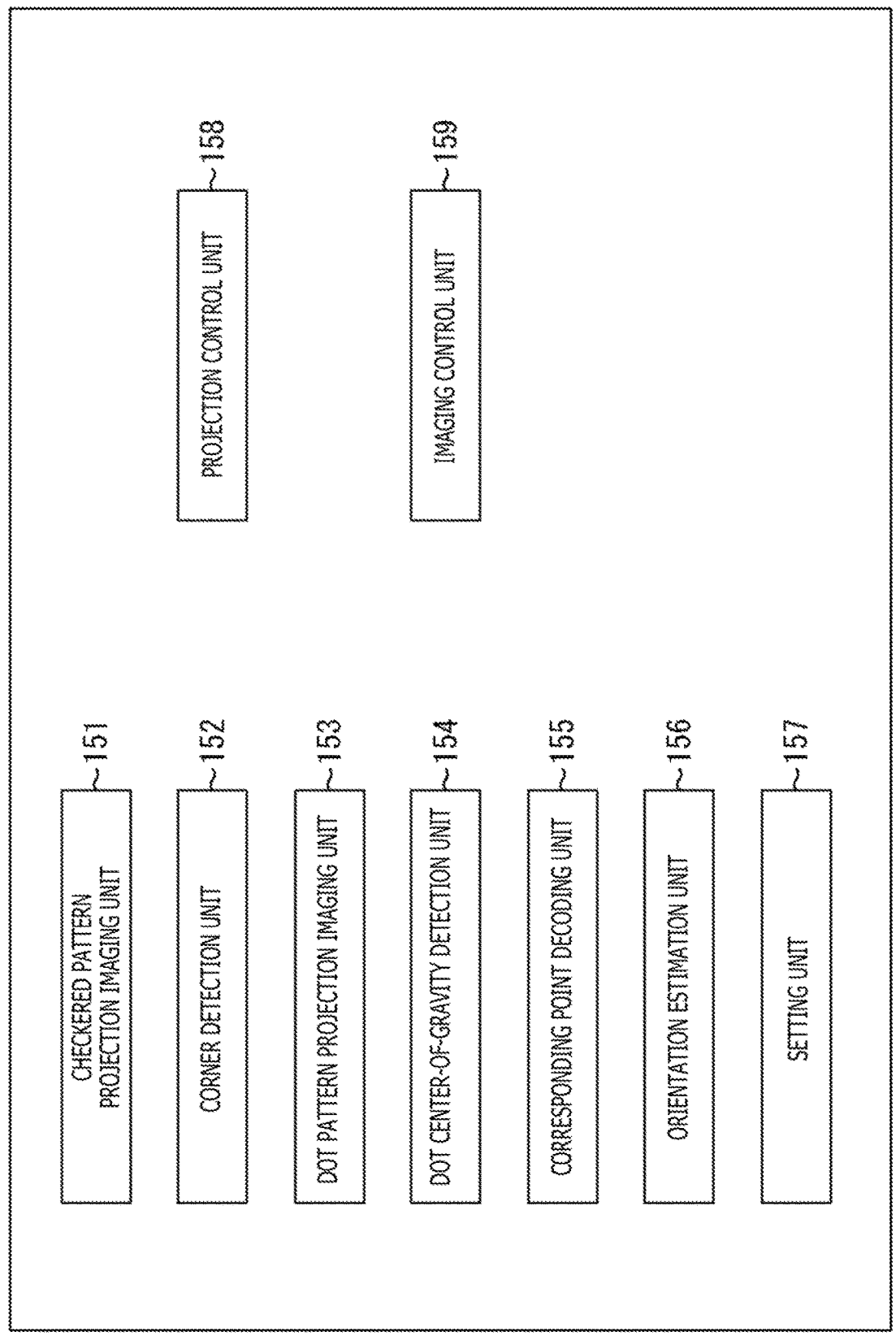
FIG. 10 is a functional block diagram illustrating an example of functions realized by the control apparatus.

FIG. 10 is a functional block diagram illustrating an example of functions realized by the control apparatus 101 executing a program or the like. As illustrated in FIG. 10, the control apparatus 101 executes the program to provide functions of a checkered pattern projection imaging unit 151, a corner detection unit 152, a dot pattern projection imaging unit 153, a dot center-of-gravity detection unit 154, a corresponding point decoding unit 155, an orientation estimation unit 156, a setting unit 157, a projection control unit 158, and an imaging control unit 159.

The checkered pattern projection imaging unit 151 executes a process regarding projection and capturing of a checkered pattern image. The corner detection unit 152 executes a process regarding detection of corner parts of a checkered pattern. The dot pattern projection imaging unit 153 executes a process regarding projection and capturing of a dot pattern image. The dot center-of-gravity detection unit 154 executes a process regarding detection of a dot and detection of the center of gravity of the dot. The corresponding point decoding unit 155 executes a process regarding detection of a corresponding point between a projected image and a captured image. The orientation estimation unit 156 executes a process regarding orientation estimation and the like of each projection imaging apparatus 102 (or the projection unit 111 and the imaging unit 112 of each projection imaging apparatus 102). The setting unit 157 executes a process regarding setting of parameters related to geometric correction or the like. The projection control unit 158 executes a process regarding control of each projection unit 111. The imaging control unit 159 executes a process regarding control of each imaging unit 112.

Note that the blocks can mutually transfer information (for example, commands, data, and the like) as necessary.

<Corner Detection Unit and Dot Center-of-Gravity Detection Unit>

Figure 11:
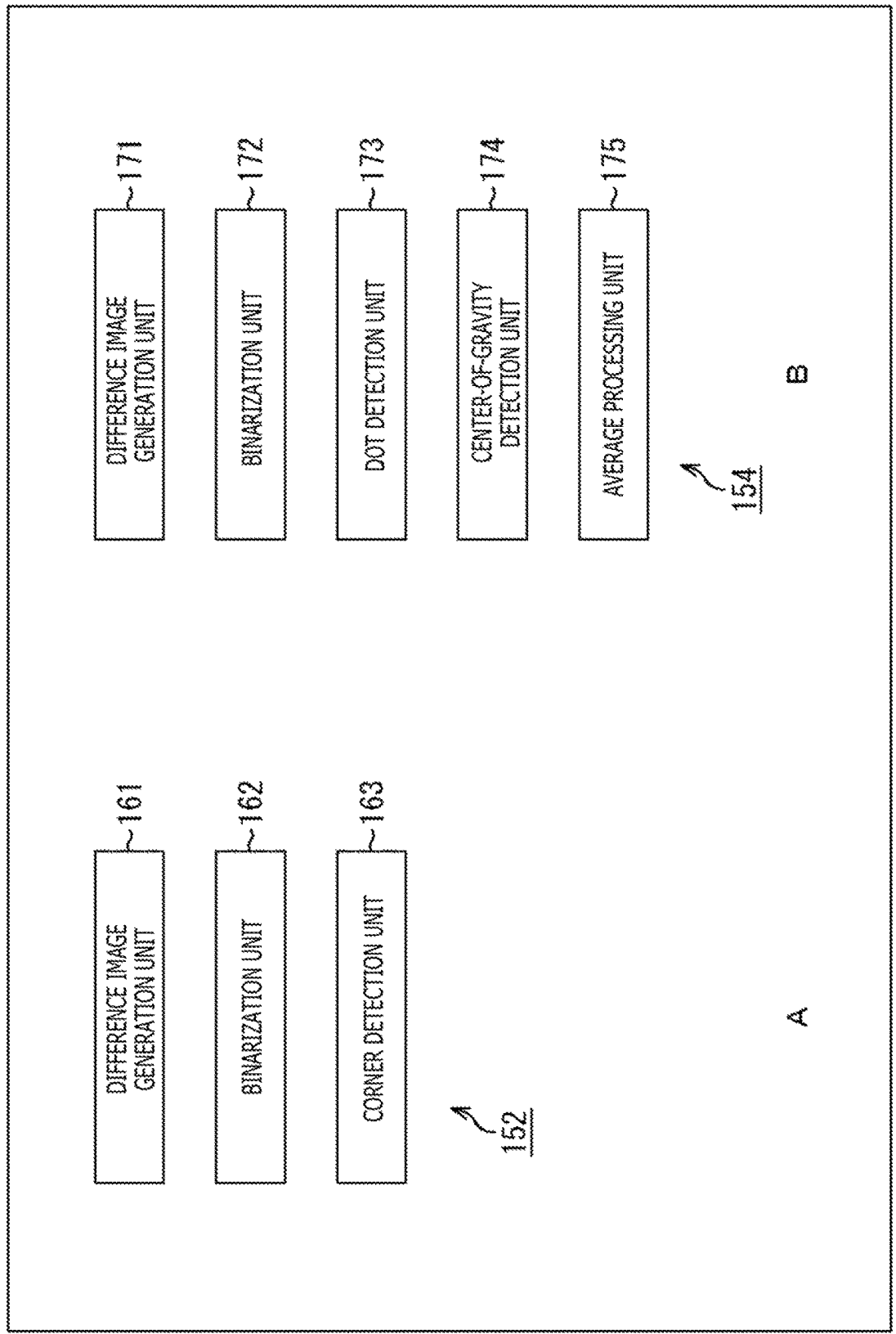
FIG. 11 is a functional block diagram illustrating an example of functions realized by a corner detection unit and a dot center-of-gravity detection unit.

The corner detection unit 152 of FIG. 10 has functions indicated by functional blocks in A of FIG. 11. That is, the corner detection unit 152 has functions of, for example, a difference image generation unit 161, a binarization unit 162, and a corner detection unit 163.

The difference image generation unit 161 executes a process regarding generation of a difference image between captured images. The binarization unit 162 executes a process regarding generation of a binary image obtained by binarizing the difference image. The corner detection unit 163 executes a process regarding detection of a corner included in the binary image.

Obviously, the corner detection unit 152 may have other functions.

The dot center-of-gravity detection unit 154 of FIG. 10 has functions indicated by functional blocks in B of FIG. 11. That is, the dot center-of-gravity detection unit 154 has functions of a difference image generation unit 171, a binarization unit 172, a dot detection unit 173, a center-of-gravity detection unit 174, and an average processing unit 175.

The difference image generation unit 171 executes a process regarding generation of a difference image between captured images. The binarization unit 172 executes a process regarding generation of a binary image obtained by binarizing the difference image. The dot detection unit 173 executes a process regarding detection of a dot included in the binary image. The center-of-gravity detection unit 174 executes a process regarding detection of the center of gravity of the dot. The average processing unit 175 executes a process regarding averaging of the positions of the centers of gravity of the dots in the time direction.

Obviously, the dot center-of-gravity detection unit 154 may have other functions.

Note that the blocks can mutually transfer information (for example, commands, data, and the like) as necessary.

<Projection Imaging Apparatus>

Figure 12:
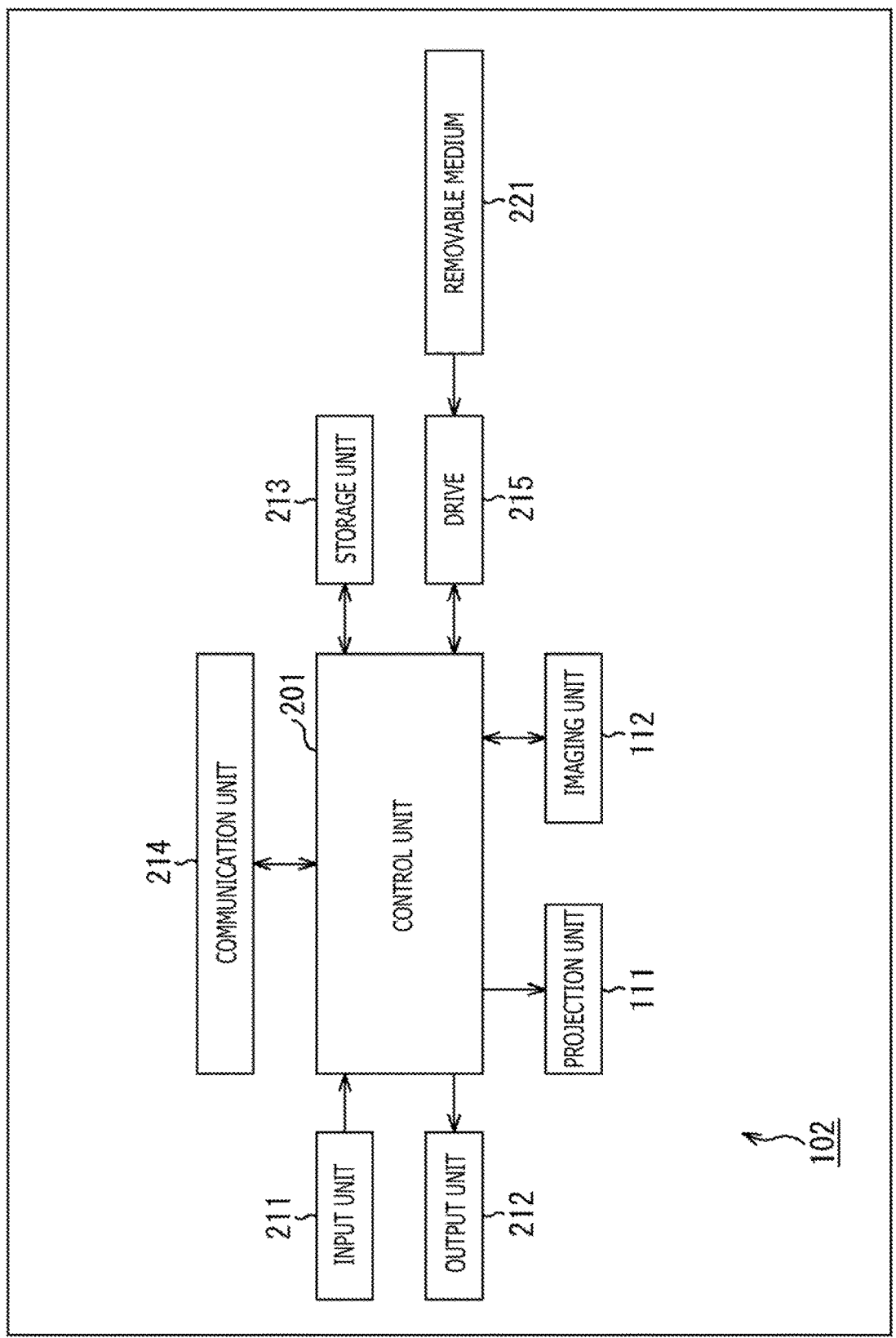
FIG. 12 is a block diagram illustrating a main configuration example of a projection imaging apparatus.

FIG. 12 is a block diagram illustrating a main configuration example of the projection imaging apparatus 102. As illustrated in FIG. 12, the projection imaging apparatus 102 includes a control unit 201, the projection unit 111, the imaging unit 112, an input unit 211, an output unit 212, a storage unit 213, a communication unit 214, and a drive 215.

The control unit 201 includes, for example, a CPU, a ROM, a RAM, and the like and is configured to control each processing unit in the apparatus and execute various processes, such as imaging processing, necessary for the control. The control unit 201 executes the processes on the basis of, for example, the control of the control apparatus 101.

The projection unit 111 is controlled by the control unit 201 and is configured to execute a process regarding projection of an image. For example, the projection unit 111 projects an image supplied from the control unit 201 to the outside (for example, projection surface or the like) of the projection imaging apparatus 102. The projection unit 111 uses a laser beam as a light source and uses a MEMS (Micro Electro Mechanical Systems) mirror to scan the laser beam to project the image. Obviously, the light source of the projection unit 111 is arbitrary, and the light source is not limited to the laser beam. For example, the light source may be an LED (Light Emitting Diode), xenon, or the like.

The imaging unit 112 is controlled by the control unit 201 and is configured to image an object outside of the apparatus (for example, projection surface or the like), generate a captured image, and supply the captured image to the control unit 201. For example, the imaging unit 112 captures a projected image projected by the projection unit 111 to the projection surface. The imaging unit 112 includes, for example, an image sensor using CMOS (Complementary Metal Oxide Semiconductor), an image sensor using CCD (Charge Coupled Device), or the like, and the image sensor photoelectrically converts light from the object to generate an electrical signal (data) of the captured image.

The input unit 211 includes, for example, an input device that receives arbitrary external information, such as a user input. The input device may be any device. For example, the input device may be an operation button, a touch panel, a camera, a microphone, an input terminal, or various sensors, such as an acceleration sensor, an optical sensor, and a temperature sensor. The output unit 212 includes, for example, an output device that outputs arbitrary information inside of the apparatus, such as an image and sound. The output device may be any device. For example, the output device may be a display, a speaker, an output terminal, or the like.

The storage unit 213 includes a storage medium that stores information, such as programs and data. The storage medium may be any medium. For example, the storage medium may be a hard disk, a RAM disk, a non-volatile memory, or the like.

The communication unit 214 includes a communication device that communicates with an external apparatus to transmit and receive information, such as programs and data, through a predetermined communication medium (for example, arbitrary network such as the Internet). The communication device may be any device. For example, the communication device may be a network interface. For example, the communication unit 214 is connected to the communication cable 103 and is capable of communicating with the control apparatus 101 connected through the communication cable 103. The communication method and the communication standard of the communication by the communication unit 214 are arbitrary. For example, the communication unit 214 may be able to perform wired communication, may be able to perform wireless communication, or may be able to perform both of them.

The drive 215 executes a process regarding reading and writing of information (such as a program and data) to a removable medium 221 mounted on the drive 215. The removable medium 221 may be any recording medium. For example, the removable medium 221 may be a magnetic disk, an optical disk, a magneto-optical disk, a semiconductor memory, or the like. For example, the drive 215 reads information (such as a program and data) stored in the removable medium 221 mounted on the drive 215 and supplies the information to the control unit 201 or the like. In addition, for example, the drive 215 acquires information (such as a program and data) supplied from the control unit 201 or the like and writes the information to the removable medium 221 mounted on the drive 215.

<Projection Unit>

Figure 13:
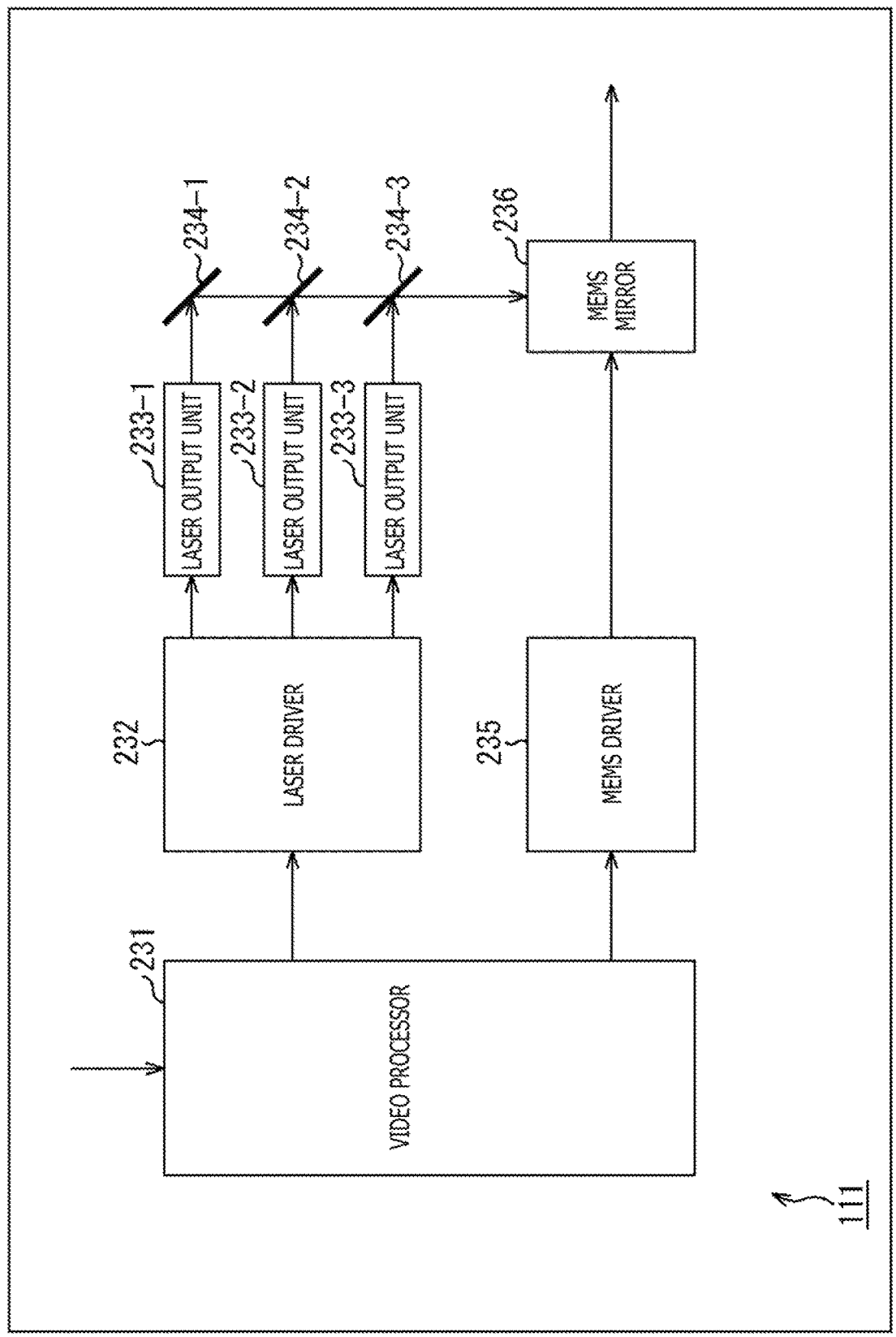
FIG. 13 is a block diagram illustrating a main configuration example of a projection unit.

FIG. 13 is a block diagram illustrating a main configuration example of the projection unit 111. As illustrated in FIG. 13, the projection unit 111 includes a video processor 231, a laser driver 232, a laser output unit 233-1, a laser output unit 233-2, a laser output unit 233-3, a mirror 234-1, a mirror 234-2, a mirror 234-3, a MEMS driver 235, and a MEMS mirror 236.

The video processor 231 holds an image supplied from the control unit 201 and applies necessary image processing to the image. The video processor 231 supplies the image to be projected to the laser driver 232 and the MEMS driver 235.

The laser driver 232 controls the laser output units 233-1 to 233-3 to project the image supplied from the video processor 231. The laser output units 233-1 to 233-3 output, for example, laser beams of different colors (wavelength regions), such as red, blue, and green. That is, the laser driver 232 controls the laser output of each color to project the image supplied from the video processor 231. Note that the laser output units 233-1 to 233-3 will be referred to as laser output units 233 in a case where the distinction is not necessary in the description.

The mirror 234-1 reflects the laser beam output from the laser output unit 233-1 and guides the laser beam to the MEMS mirror 236. The mirror 234-2 reflects the laser beam output from the laser output unit 233-2 and guides the laser beam to the MEMS mirror 236. The mirror 234-3 reflects the laser beam output from the laser output unit 233-3 and guides the laser beam to the MEMS mirror 236. Note that the mirrors 234-1 to 234-3 will be referred to as mirrors 234 in a case where the distinction is not necessary in the description.

Figure 14:
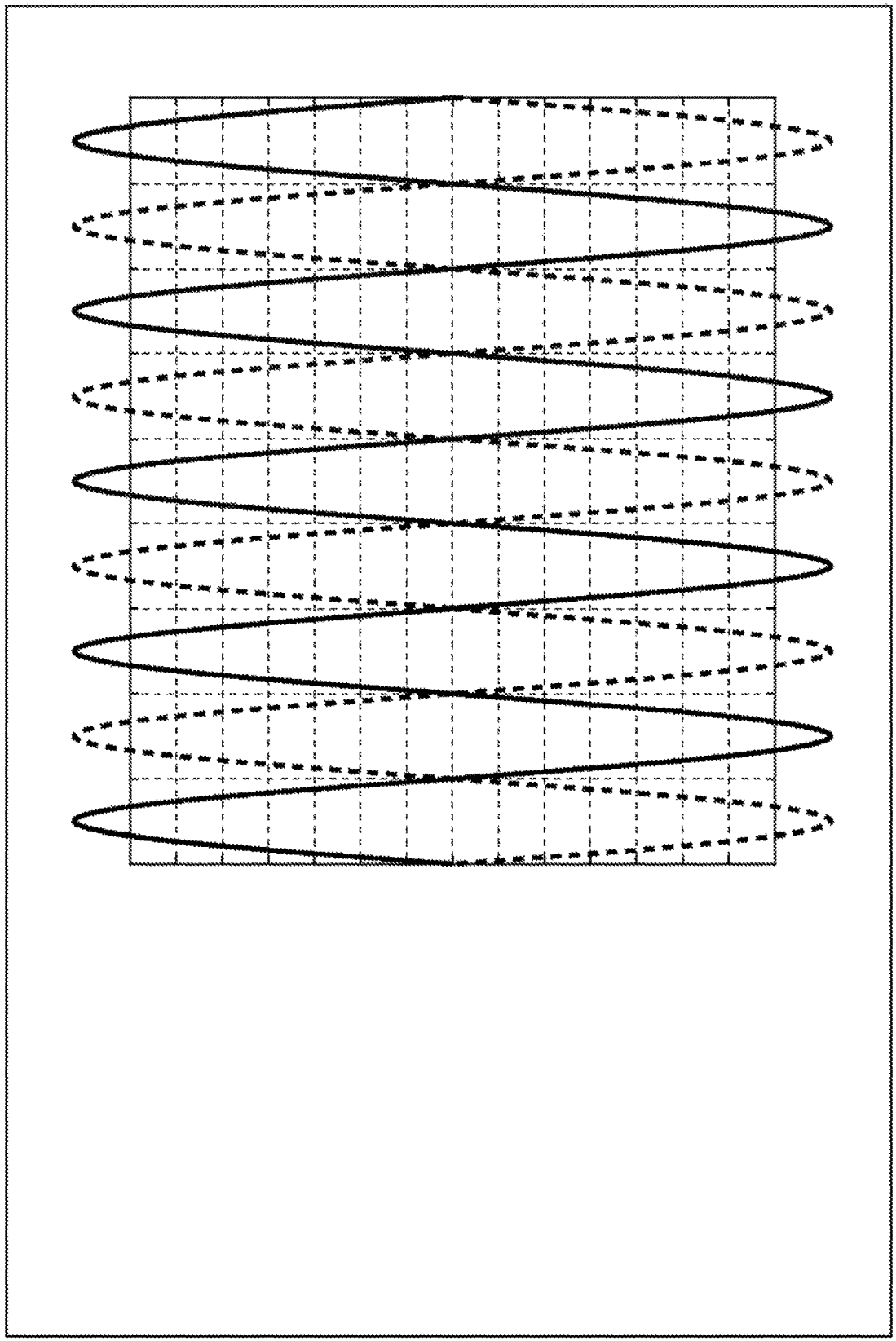
FIG. 14 is a diagram illustrating an example of scan of a laser beam.

The MEMS driver 235 controls the drive of the mirror of the MEMS mirror 236 to project the image supplied from the video processor 231. The MEMS mirror 236 drives the mirror attached to the MEMS according to the control of the MEMS driver 235 to scan, for example, the laser beam of each color as in an example of FIG. 14. The laser beam is output from a projection opening to the outside of the apparatus and emitted to, for example, the projection surface. As a result, the image supplied from the video processor 231 is projected to the projection surface.

Note that although three laser output units 233 are provided to output laser beams of three colors in the description of the example of FIG. 13, the number of laser beams (or the number of colors) is arbitrary. For example, the number of laser output units 233 may be four or more or may be two or less. That is, the number of laser beams output from the projection imaging apparatus 102 (projection units 111) may be two or less or may be four or more. The number of colors of the laser beams output from the projection imaging apparatus 102 (projection units 111) is also arbitrary, and the number of colors may be two or less or may be four or more. In addition, the configurations of the mirrors 234 and the MEMS mirror 236 are also arbitrary, and the configurations are not limited to the example of FIG. 13. Obviously, the scan pattern of the laser beam is arbitrary.

<Flow of Setting Process>

Next, a process executed by the projection imaging system 100 configured in this way will be described. As described above, the control apparatus 101 of the projection imaging system 100 controls each projection imaging apparatus 102 to project an image of content or the like. At a predetermined timing during the projection or on the basis of an occurrence of a predetermined event such as reception of an instruction, the control apparatus 101 performs the setting again regarding the geometric correction, that is, resets the parameters regarding the geometric correction. The control apparatus 101 sets the parameters regarding the geometric correction while projecting the image of the content or the like on the basis of the online sensing of the ISL system.

In this way, once the parameters regarding the geometric correction are updated during the projection of the image, the control apparatus 101 projects the subsequent images after applying the geometric correction to the images on the basis of the updated parameters.

An example of a flow of a setting process executed by the control apparatus 101 to set the parameters regarding the geometric correction will be described with reference to a flow chart of FIG. 15.

Once the setting process is started, the components from the checkered pattern projection imaging unit 151 to the corresponding point decoding unit 155 of the control apparatus 101 control each projection imaging apparatus 102 through the projection control unit 158 and the imaging control unit 159 to project and capture a pattern image and detect corresponding points in step S101. The details will be described later.

In step S102, the orientation estimation unit 156 uses the corresponding points detected in step S101 to estimate the orientations of each projection unit 111 and each imaging unit 112 (or each projection imaging apparatus 102) and reconstruct the screen (projection surface). The screen reconstruction is a process of setting the shape of the screen that is the projection surface.

In step S103, the setting unit 157 sets the parameters regarding the geometric correction of the image to be projected from each projection unit 111 as necessary on the basis of the processing results of the orientation estimation and the screen reconstruction executed in step S102.

When the process of step S103 is finished, the setting process ends.

<Flow of Corresponding Point Detection Process>

Next, an example of a flow of the corresponding point detection process executed in step S101 of FIG. 15 will be described with reference to flow charts of FIGS. 16 and 17.

<Process Regarding Detection of Corners>

Once the corresponding point detection process is started, the control apparatus 101 first projects a checkered pattern image, captures the projected image, and detects feature points that are corners of a checkered pattern included in the captured image.

Figure 18:
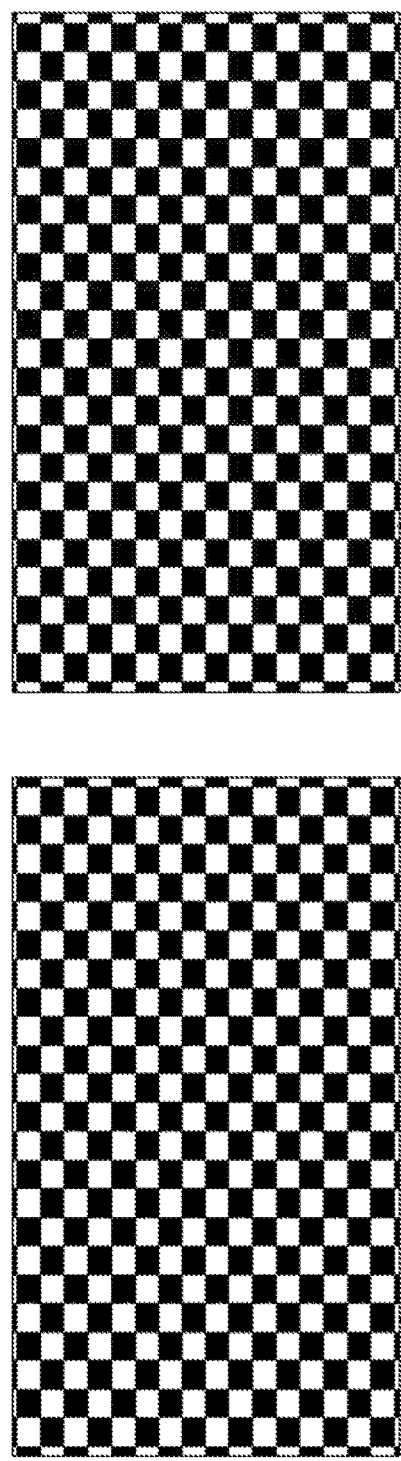
FIG. 18 is a diagram describing an example of checkered patterns.

The checkered pattern image is an image of the checkered pattern. The checkered pattern is a pattern (design) in which a plurality of pictures with different pixel values (one of or both luminance and color) are lined up. FIG. 18 illustrates examples of the checkered pattern image. For example, a checkered pattern image 301-1 illustrated in FIG. 18 is an image of a checkered pattern in which white rectangles and black rectangles are alternately arranged in a matrix. The number of rectangles included in the checkered pattern is arbitrary and is not limited to the example of FIG. 18. It is only necessary that rectangles with different pixel values be lined up adjacent to each other in the arrangement of the rectangles, and the rectangles may be arranged and lined up in a manner other than the matrix. The sizes and the shapes of the rectangles may not be uniform.

Figure 19:
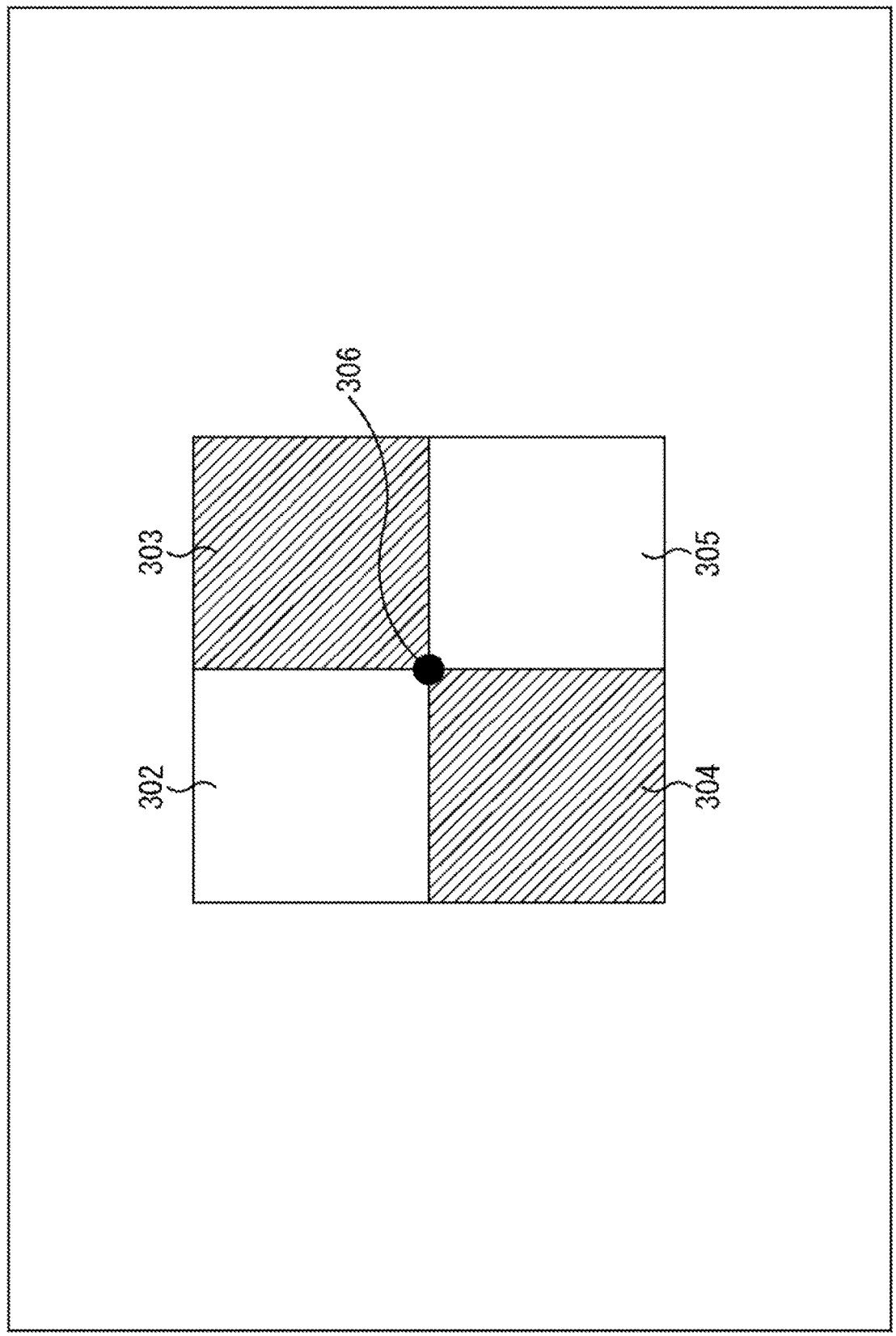
FIG. 19 is a diagram describing an example of a feature point.

The corners of the checkered pattern are parts of joints (also referred to as corners) of the pictures included in the checkered pattern. For example, in the case of the checkered pattern image 301-1 of FIG. 18, the corners of each rectangle are detected as the corners of the checkered pattern. In the case of the checkered pattern, the corners of adjacent rectangles may be at the same position as in rectangles 302 to 305 illustrated in FIG. 19. In such a case, the corners at the same position are collectively detected as one corner 306.

Note that although the corners can be detected from a captured image of a projected image of one checkered pattern image, the corners may be detected from a difference image of captured images of projected images of a pair of checkered pattern images in which the pattern is reversed. For example, a checkered pattern image 301-2 of FIG. 18 is an image in which the pattern of the checkered pattern image 301-1 is reversed (that is, an image of a pattern in which the positions of the white rectangles and the positions of the black rectangles are switched). A difference image between the captured image of the projected image of the checkered pattern image 301-1 and the captured image of the projected image of the checkered pattern image 301-2 may be obtained, and corners of the checkered pattern may be detected in the difference image.

In general, the differences between the luminance values of the white rectangles and the black rectangles are more prominent in the difference image than in the captured image of the projected image of the checkered pattern image 301-1 and the captured image of the projected image of the checkered pattern image 301-2. Therefore, the S/N ratio of the checkered pattern improves. That is, the difference image can be used to more accurately detect the corners of the checkered pattern than in the case of using each captured image.

To obtain the difference image, the control apparatus 101 causes the projection unit 111 to sequentially project the pair of checkered pattern images in which the patterns are reversed. In the case of the example of FIG. 18, the control apparatus 101 causes the projection unit 111 to project the checkered pattern image 301-1 and the checkered pattern image 301-2 at different timings. For example, in a case where the content being projected is moving images, the control apparatus 101 causes the projection unit 111 to project the checkered pattern image 301-1 and the checkered pattern image 301-2 by superimposing the images on different frames of the moving images. In this way, the imaging unit 112 can obtain the captured image of the projected image of each checkered pattern image.

The checkered pattern image is projected by each projection unit 111. The projection units 111, that is, the control apparatus 101 causes all the projection units 111 to, sequentially project all the prepared checkered pattern images.

The projected image of the checkered pattern image is captured by each imaging unit 112. That is, the control apparatus 101 causes all the imaging units 112 to capture projected images of all the checkered pattern images projected by all the projection units 111.

Hereinafter, an example of a flow of a specific process will be described. In step S121 of FIG. 16, the projection control unit 158 selects an unprocessed projection unit 111 as a processing target (control target).

In step S122, the checkered pattern projection imaging unit 151 selects an unprocessed checkered pattern image as a processing target.

In step S123, the projection control unit 158 controls the projection unit 111 as a processing target selected in step S121 to project the checkered pattern image as a processing target selected in step S122. In this case, the projection control unit 158 superimposes the checkered pattern image as a processing target on the image of an arbitrary frame of the moving images being projected and supplies the image to the projection unit 111 as a processing target to project the image superimposed on the image of the arbitrary frame of the moving images.

In step S124, the imaging control unit 159 selects an unprocessed imaging unit 112 as a processing target (control target).

In step S125, the imaging control unit 159 controls the imaging unit 112 as a processing target selected in step S124 to capture the projected image of the checkered pattern image as a processing target projected in step S123. The imaging control unit 159 then acquires the captured image obtained by the imaging unit 112 as a processing target.

As described above, the checkered pattern image is superimposed on the image of the predetermined frame of the moving images and projected, and the captured image includes at least part of the checkered pattern image and the image of the predetermined frame of the moving images.

In step S126, the imaging control unit 159 determines whether or not all the imaging units 112 have captured the projected images of the checkered pattern images as processing targets. If the imaging control unit 159 determines that there is an unprocessed imaging unit 112, the process returns to step S124. In addition, if the imaging control unit 159 determines that all the imaging units 112 have captured the projected images in step S126, the process proceeds to step S127. That is, each process of steps S124 to S126 is executed for each imaging unit 112. Note that the processes may be skipped for the imaging unit 112 not including the projected image of the checkered pattern image as a processing target in the imaging range.

After causing all the imaging units S112 to capture the projected images of the checkered pattern images as processing targets, the checkered pattern projection imaging unit 151 determines whether or not all the checkered pattern images are processed (projected) in step S127. If the checkered pattern projection imaging unit 151 determines that there is an unprocessed checkered pattern image, the process returns to step S122. In addition, if the checkered pattern projection imaging unit 151 determines that all the checkered pattern images are processed in step S127, the process proceeds to step S128. That is, each process of steps S122 to S127 is executed for each checkered pattern image.

After causing all the imaging units 112 to capture the projected images of all the checkered pattern images, the corner detection unit 152 in step S128 detects feature points that are corners of the checkered pattern included in the captured image obtained in step S125.

Although the detection method of the corners is arbitrary, the corners are basically detected on the basis of surrounding pixel values or the like. For example, in the case of FIG. 19, the corner 306 is detected as a part where boundaries (edges) of the rectangles 302 to 305 intersect.

Details of the process regarding the detection of the corners will be described later.

In step S129, the projection control unit 158 determines whether or not all the projection units 111 have projected the checkered pattern images. If the projection control unit 158 determines that there is an unprocessed projection unit 111, the process returns to step S121. In addition, if the projection control unit 158 determines that all the projection units 111 have projected all the checkered pattern images in step S129, the process proceeds to step S130. That is, each process of steps S121 to S129 is executed for each projection unit 111.

After causing all the projection units 111 to project the projected images of all the checkered pattern images and causing all the imaging units 112 to capture all the projected images, the corner detection unit 152 in step S130 generates map information including coordinates of the corners detected as described above and thresholds for identifying the patterns (for example, white and black) at the corners.

Figure 17:
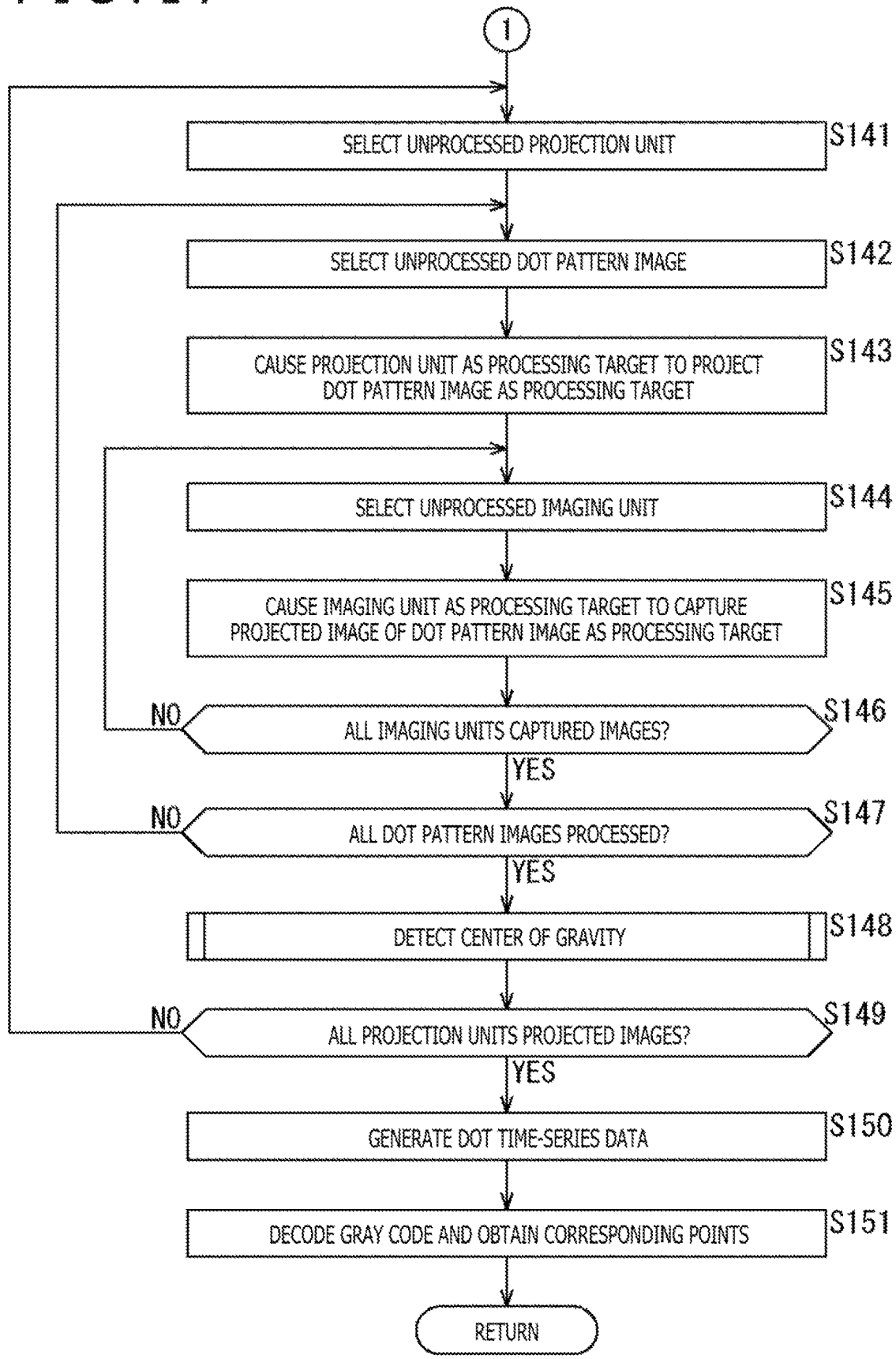
FIG. 17 is a flow chart describing the example of the flow of the corresponding point detection process continued from FIG. 16.

When the process of step S130 is finished, the process proceeds to FIG. 17.

<Process Regarding Detection of Dots>

Next, the control apparatus 101 projects dot pattern images, captures the projected images, and detects dots included in the captured images.

The dot pattern image is an image of a dot pattern. The dot pattern is a pattern (design) in which a single or a plurality of dots are arranged at predetermined positions. The dot is, for example, a point or a picture indicating a substantially circular area formed by a single or a plurality of pixels. The predetermined position is, for example, the same position as the corner of the checkered pattern or a position around the corner (near the corner). Hereinafter, the dot at the same position as the corner or at the position around the corner will also be referred to as a dot corresponding to the corner (feature point).

A plurality of dot patterns are provided as a set. The arrangement patterns of the dots forming the dot patterns provided as a set are different from each other. That is, the positions of at least part of the dots are different from each other in the dot patterns. Note that the dot patterns provided as a set are sequentially projected along a time line (in the time direction). That is, the dot patterns are projected at different timings. Then, the dots of each dot pattern are arranged such that the appearance pattern of the dots in the time direction corresponding to the same corners is uniquely determined in the case where the dots are projected in this way.

Figure 20:
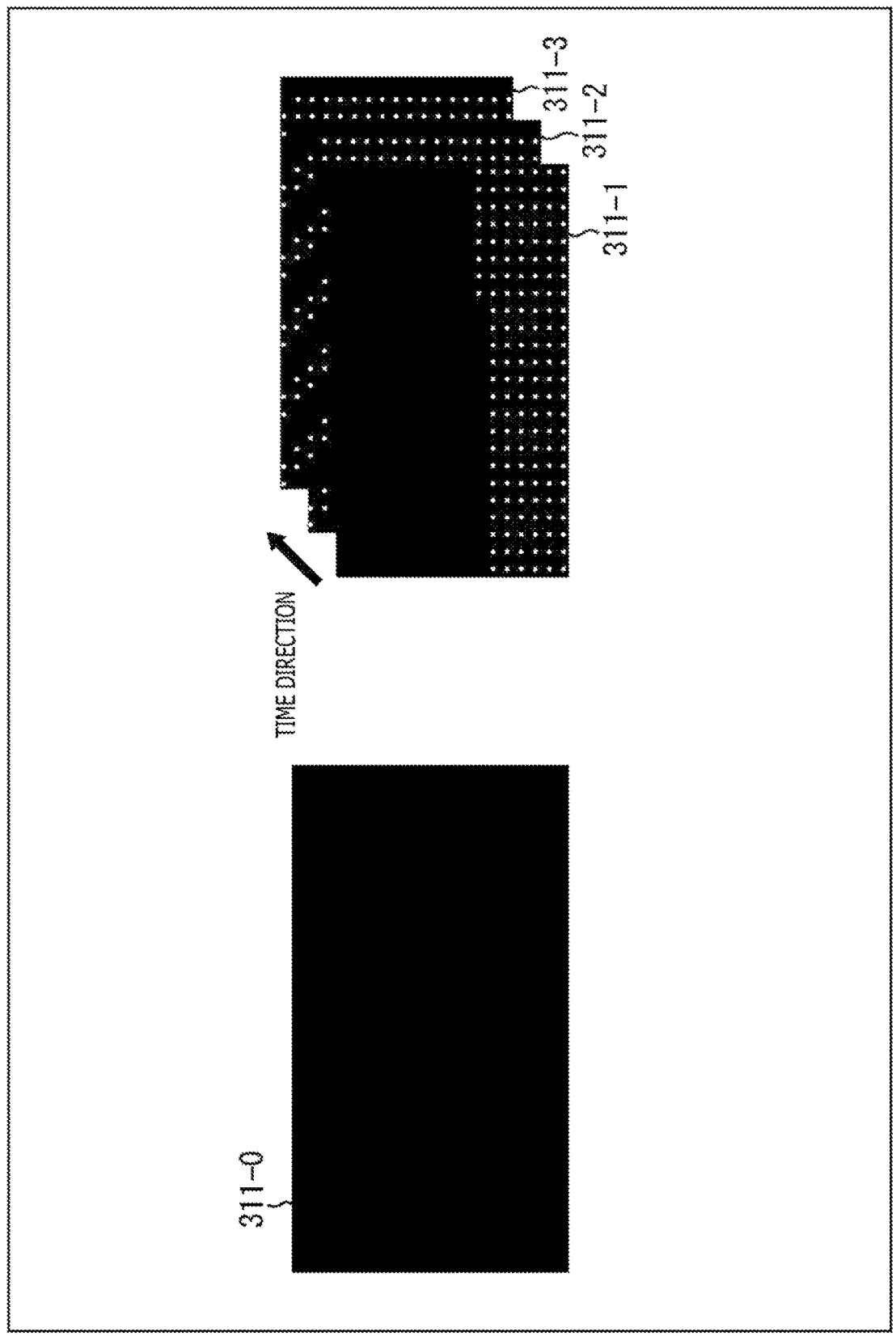
FIG. 20 is a diagram describing an example of dot patterns.

FIG. 20 illustrates an example of the dot pattern images. For example, dots (white points) corresponding to part or all of the corners (feature points) of the checkered pattern are arranged on each of dot pattern images 311-1 to 311-3 illustrated on the right side of FIG. 20. That is, the dots are formed at the same positions as or around some of the corners of the checkered pattern in each of the dot pattern images 311-1 to 311-3. Then, in a case where the dot pattern images 311-1 to 311-3 are sequentially projected in the time direction, the appearance pattern of the dots in the time direction at the same positions as or around the corners is uniquely determined.

For example, the dot appears in the dot pattern image 311-1 and the dot pattern image 311-3 at the same position as or around a corner A at a predetermined position of the checkered pattern. The dot appears in the dot pattern image 311-2 and the dot pattern image 311-3 at the same position as or around a corner B at another position. The dot appears in the dot pattern image 311-1 and the dot pattern image 311-2 at the same position as or around a corner C at yet another position. The appearance pattern of the dots in time direction is uniquely determined, and the corners corresponding to the dots can be identified on the basis of the appearance pattern.

Note that in the dot pattern images 311-1 to 311-3, the sizes of the dots (white points) are substantially the same, and the shapes are substantially the same. In addition, the background is a uniform black image and is common to the dot pattern images 311-1 to 311-3.

In the case of detecting the dots from the captured image, although the dots can be detected from the captured image of the projected image of one dot pattern image (for example, in the case of FIG. 20, the captured image of the projected image of each of the dot pattern images 311-1 to 311-3) the dots may also be detected from a difference image between each captured image and a captured image of the projected image of an image not including the dot pattern.

For example, a dot pattern image 311-0 not including the dot pattern as illustrated on the left side of FIG. 20 may be projected at a timing different from the dot pattern images 311-1 to 311-3. A difference image between the captured image of the projected image of each of the dot pattern images 311-1 to 311-3 and the captured image of the projected image of the dot-pattern image 311-0 may be obtained, and the dots may be detected in the difference image.

The dot pattern image 311-0 is an image similar to the dot pattern images 311-1 to 311-3 except that the dot pattern is not included. That is, the dot pattern image 311-0 is formed by a uniform black image similar to the background image of the dot pattern images 311-1 to 311-3.

In general, the differences in the luminance values between the parts of the dots and the other parts of the background are more prominent in the difference image than in the captured image of the projected image of each of the dot pattern images 311-1 to 311-3. Therefore, the S/N ratio of the dot pattern improves. That is, the dots can be more accurately detected by using the difference image than by using each captured image.

The dot pattern images are projected by each projection unit 111. The projection units 111, that is, the control apparatus 101 causes all the projection units 111 to, sequentially project all the prepared dot pattern images.

The projected images of the dot pattern images are captured by each imaging unit 112. That is, the control apparatus 101 causes all the imaging units 112 to capture the projected images of all the dot pattern images projected by all the projection units 111.

Hereinafter, an example of a flow of a specific process will be described. In step S141 of FIG. 17, the projection control unit 158 selects an unprocessed projection unit 111 as a processing target (control target).

In step S142, the dot pattern projection imaging unit 153 selects an unprocessed dot pattern image as a processing target.

In step S143, the projection control unit 158 controls the projection unit 111 as a processing target selected in step S141 to project the dot pattern image as a processing target selected in step S142. In this case, the projection control unit 158 superimposes the dot pattern image as a processing target on the image of an arbitrary frame of the moving images being projected and supplies the image to the projection unit 111 as a processing target to project the image superimposed on the image of the arbitrary frame of the moving images.

In step S144, the imaging control unit 159 selects an unprocessed imaging unit 112 as a processing target (control target).

In step S145, the imaging control unit 159 controls the imaging unit 112 as a processing target selected in step S144 to capture the projected image of the dot pattern image as a processing target projected in step S143. The imaging control unit 159 then acquires the captured image obtained by the imaging unit 112 as a processing target.

As described above, the dot pattern image is superimposed on the image of the predetermined frame of the moving images and projected, and the captured image includes at least part of the dot pattern image and the image of the predetermined frame of the moving images.

In step S146, the imaging control unit 159 determines whether or not all the imaging units 112 have captured the projected images of the dot pattern images as processing targets. If the imaging control unit 159 determines that there is an unprocessed imaging unit 112, the process returns to step S144. In addition, if the imaging control unit 159 determines that all the imaging units 112 have captured the projected images in step S146, the process proceeds to step S147. That is, each process of steps S144 to S146 is executed for each imaging unit 112. Note that the processes may be skipped for the imaging unit 112 not including the projected image of the dot pattern image as a processing target in the imaging range.

After causing all the imaging units 112 to capture the projected images of the dot pattern images as processing targets, the dot pattern projection imaging unit 153 determines whether or not all the dot pattern images are processed (projected) in step S147. If the dot pattern projection imaging unit 153 determines that there is an unprocessed dot pattern image, the process returns to step S142. In addition, if the dot pattern projection imaging unit 153 determines that all the dot pattern images are processed in step S147, the process proceeds to step S148. That is, each process of steps S142 to S147 is executed for each dot pattern image.

After causing all the imaging units 112 to capture the projected images of all the dot pattern images, the dot center-of-gravity detection unit 154 in step S148 detects the dots included in the captured image obtained in step S145. Note that the dot center-of-gravity detection unit 154 may further detect the centers of gravity of the detected dots. In addition, the dot center-of-gravity detection unit 154 may obtain the center of gravity of the dot corresponding to the corner averaged in the time direction.

Details of the process regarding the detection of the centers of gravity of the dots will be described later.

In step S149, the projection control unit 158 determines whether or not all the projection units 111 have projected the dot pattern images. If the projection control unit 158 determines that there is an unprocessed projection unit 111, the process returns to step S141. In addition, if the projection control unit 158 determines that all the projection units 111 have projected all the dot pattern images in step S149, the process proceeds to step S150. That is, each process of steps S141 to S149 is executed for each projection unit 111.

After causing all the projection units 111 to project the projected images of all the dot pattern images and causing all the imaging units 112 to capture all the projected images, the dot center-of-gravity detection unit 154 generates dot time-series data indicating the appearance pattern of the dot in the time direction corresponding to each corner in step S150.

In step S151, the corresponding point decoding unit 155 identifies each corner by decoding the appearance pattern of the dot in the time direction corresponding to each corner included in the dot time-series data obtained in step S150. The corresponding point decoding unit 155 then obtains the corresponding points between the projected image and the captured image on the basis of the positions of the identified corners. The corresponding point decoding unit 155 obtains the corresponding points between all the projected images and the captured images. That is, the corresponding point decoding unit 155 obtains which pixel of each projection unit 111 corresponds to which pixel of each imaging unit 112.

Figure 15:
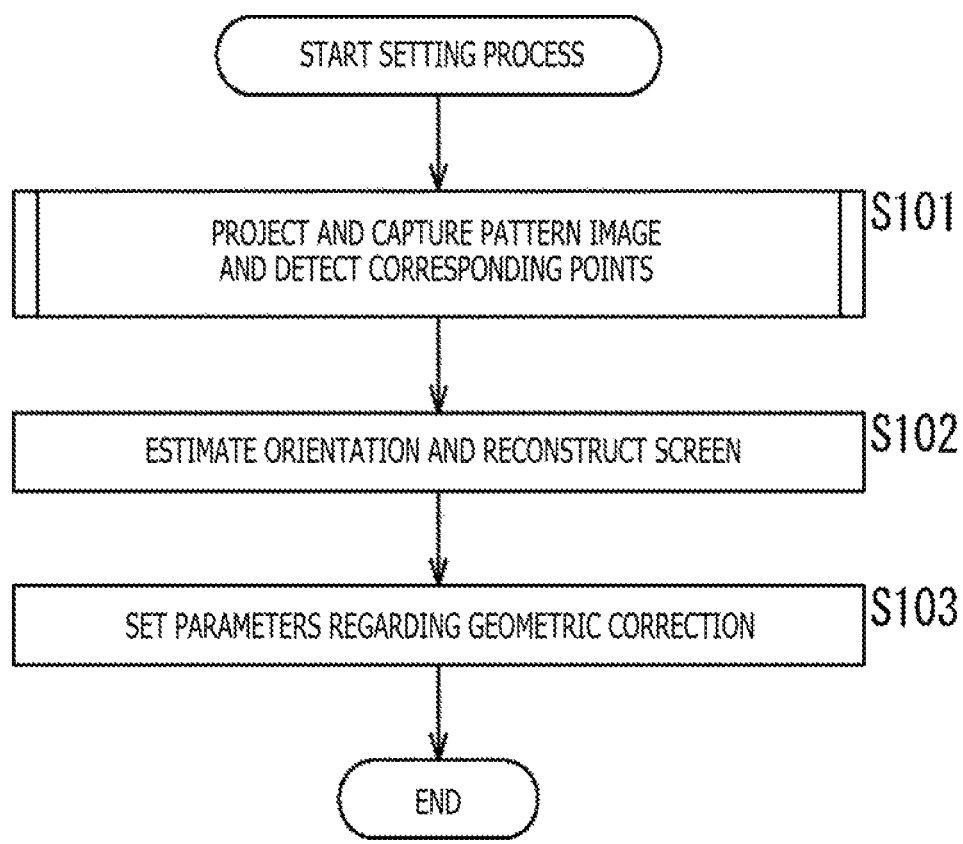
FIG. 15 is a flow chart describing an example of a flow of a setting process.

When the process of step S151 is finished, the corresponding point detection process ends, and the process returns to FIG. 15.

In this way, by using the checkered patterns to detect the corresponding points, the control apparatus 101 can detect the corresponding points on the basis of fewer pattern images than in the case of using the Gray code. Therefore, an increase in the processing time of the corresponding point detection can be suppressed.

In addition, not only the checkered patterns, but also the dot patterns are used. The control apparatus 101 can easily identify corners other than the corners of the checkered patterns, and a reduction in the detection accuracy of the corresponding points can be suppressed. In addition, a reduction in the degree of freedom of the installation of the projection unit 111 and the imaging unit 112 can be suppressed.

Therefore, the accuracy of the corresponding point detection can be improved.

<Correction of Corner Using Dot>

Note that the position of the corner may be corrected by using the dot. For example, the position of the corner may be set to the center of gravity of the dot corresponding to the corner detected in step S148. In addition, for example, the position of the corner may be set to the center of gravity of the dot corresponding to the corner averaged in the time direction obtained in step S148.

In general, the shape of the checkered pattern tends to change according to the projection angle, the screen shape, or the like, and this tends to reduce the detection accuracy of the corner. On the other hand, the dot is a small simple picture, and the projection angle, the screen shape, or the like does not change the shape much. Therefore, by using the dot pattern to detect the corner as described above, a reduction in the accuracy of the corresponding point detection due to the environment can be suppressed, and more robust corresponding point detection can be realized.

Furthermore, the corresponding point detection using only the checkered patterns cannot attain the detection accuracy equal to or smaller than pixels, and it is difficult to sufficiently increase the accuracy of triangulation. However, by using the dot pattern to perform the corresponding point detection as described above, the corresponding points can be obtained with sub-pixel accuracy, and the accuracy of triangulation can be more easily increased to a sufficiently high level.

In addition, by using the dot patterns as described above, both the identification of corners and the correction of positions can be performed, and the number of patterns can be smaller than in the case of using different patterns for the identification of corners and the correction of positions. This can suppress the increase in the processing time of the corresponding point detection.

<Corresponding Point Detection of Peripheral Section>

Note that the detection accuracy (accuracy of detected positions) of the corners positioned in a peripheral section of the checkered pattern image may be lower than the detection accuracy of the corners at positions other than the peripheral section. For example, in a case of a checkered pattern image 312 illustrated in A of FIG. 21, edges (boundaries of rectangles) exist in four directions around a corner 313 indicated by a white circle. On the other hand, a corner 314 indicated by a black circle is positioned in the peripheral section of the checkered pattern image 312, and the edge exists in only one direction around the corner 314. Furthermore, areas outside of the checkered pattern image 312 are areas with uncertain pixel values, and the detection accuracy of the peripheral section of the checkered pattern image 312 may be reduced. Therefore, the detection accuracy at the position of the corner 314 in the peripheral section may be lower than the detection accuracy of the corner 313 not in the peripheral section. That is, the detection accuracy of the corresponding points in the peripheral section may be lower than in a non-peripheral section.

Therefore, in the dot pattern image, the frequency of appearance of the dot in the time direction corresponding to the corner positioned in the peripheral section of the checkered pattern image may be set higher than the frequency of appearance of the dot in the time direction corresponding to the corner at the position other than the peripheral section of the checkered pattern image. That is, an appearance pattern with a higher frequency of appearance of dot may be preferentially allocated to the corner positioned in the peripheral section of the checkered pattern image.

Figure 21:
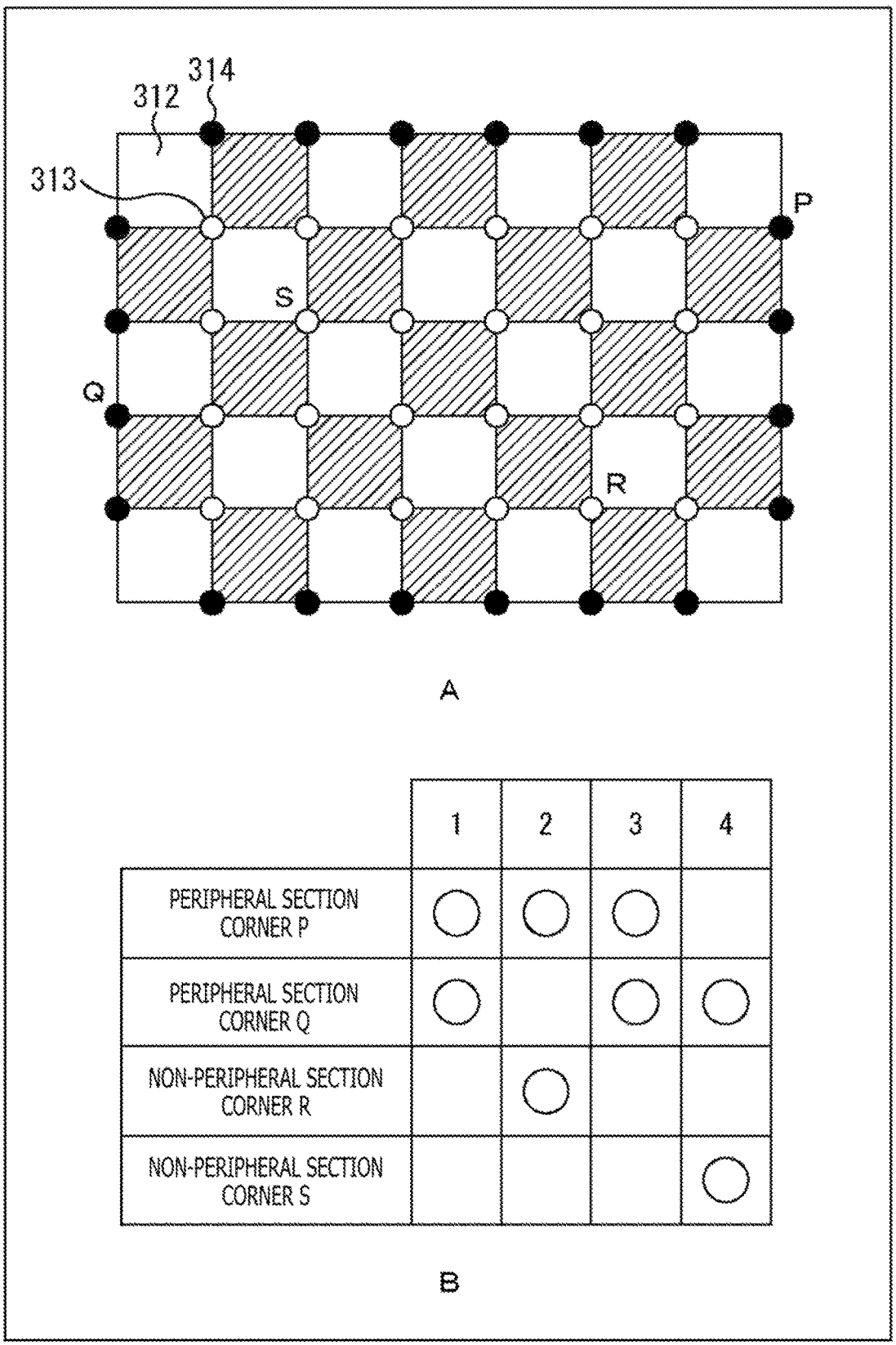
FIG. 21 is a diagram describing an example of a situation of allocation of dots.

For example, it is assumed that four dot patterns are projected to the checkered pattern image 312 illustrated in A of FIG. 21. In this case, appearance patterns of dots may be allocated to a corner P, a corner Q, a corner R, and a corner S as in a table illustrated in B of FIG. 21. In B of FIG. 21, columns with numbers 1 to 4 indicate dot patterns, and white circles indicate dots. More specifically, appearance patterns in which three dots appear are allocated to the corner P and the corner Q that are the corners 314 in the peripheral section. On the other hand, appearance patterns in which only one dot appears are allocated to the corner R and the corner S that are the corners 313 in the non-peripheral section.

In general, the higher the frequency of appearance of the dot is, the more the accuracy of the position of the center of gravity of the dot averaged in the time direction can be improved. That is, the center of gravity of the dot averaged in the time direction can be obtained at a more accurate position.

Therefore, the frequency of appearance of the dot in the time direction corresponding to the corner positioned in the peripheral section of the checkered pattern image can be set higher to correct the corner in the peripheral section to a more accurate position in the case of correcting the position of the corner on the basis of the center of gravity of the dot averaged in the time direction as described above. That is, the reduction in the detection accuracy of the corresponding points in the peripheral section can be suppressed, and sufficiently highly accurate corresponding point detection can be performed regardless of the position.

Note that in general, the closer the corresponding point to the peripheral section of the projected image, the higher the use value of the corresponding point. For example, the corresponding point close to the peripheral section can be easily used for geometric correction of the entire image. In addition, in the case of the system in which the plurality of projection units 111 project images as in the projection imaging system 100, the closer the part to the peripheral section of the projected image, the higher the possibility of the part becoming an overlap area. Therefore, the part can be easily used for the corresponding point detection for orientation estimation or screen reconstruction. In other words, in this case, the corresponding points close to the center of the projected image are unlikely to be detected in the first place, and the corresponding points are little likely to be used compared to the corresponding points close to the peripheral section.

Therefore, the appearance pattern with a higher frequency of appearance of dot may also be preferentially allocated to the corner in the non-peripheral section closer to the peripheral section. In this way, the closer the corresponding point to the peripheral section is, the more the detection accuracy of the corresponding point can be improved.

<Flow of Corner Detection Process>

Figure 22:
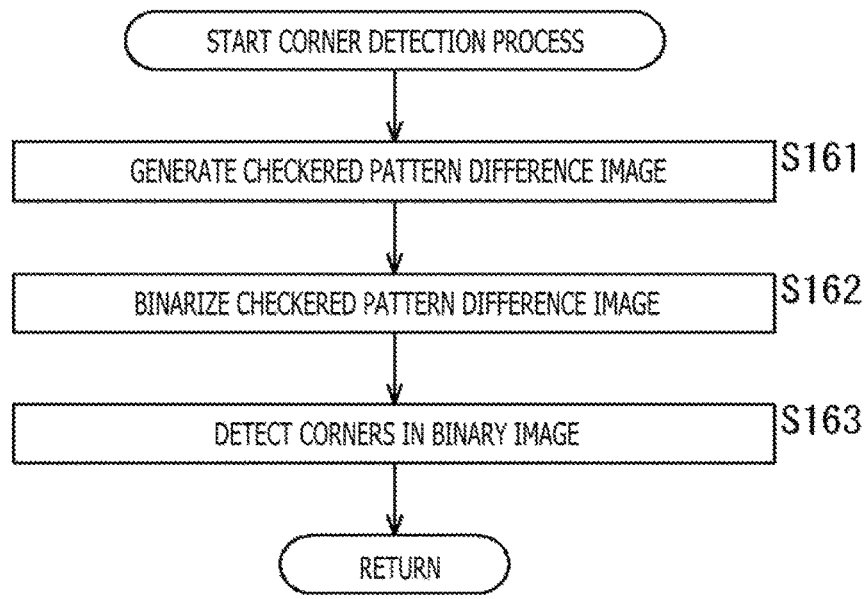
FIG. 22 is a flow chart describing an example of a flow of a corner detection process.

Next, an example of a flow of the corner detection process executed in step S128 of FIG. 16 will be described with reference to a flow chart of FIG. 22.

Once the corner detection process is started, the difference image generation unit 161 in step S161 generates a checkered pattern difference image that is a difference image between the captured images including the respective projected images of the pair of checkered pattern obtained in step S125. For example, in the case of FIG. 18, the difference image generation unit 161 generates a checkered pattern difference image between the captured image including the checkered pattern image 301-1 and the captured image including the checkered pattern image 301-2.

In step S162, the binarization unit 162 binarizes the checkered pattern difference image obtained in step S161 to obtain a binary image. The boundaries of the rectangles become more prominent by binarizing the checkered pattern difference image, and the corner detection can be further facilitated.

In step S163, the corner detection unit 163 detects corners in the binary image obtained in step S162.

Figure 16:
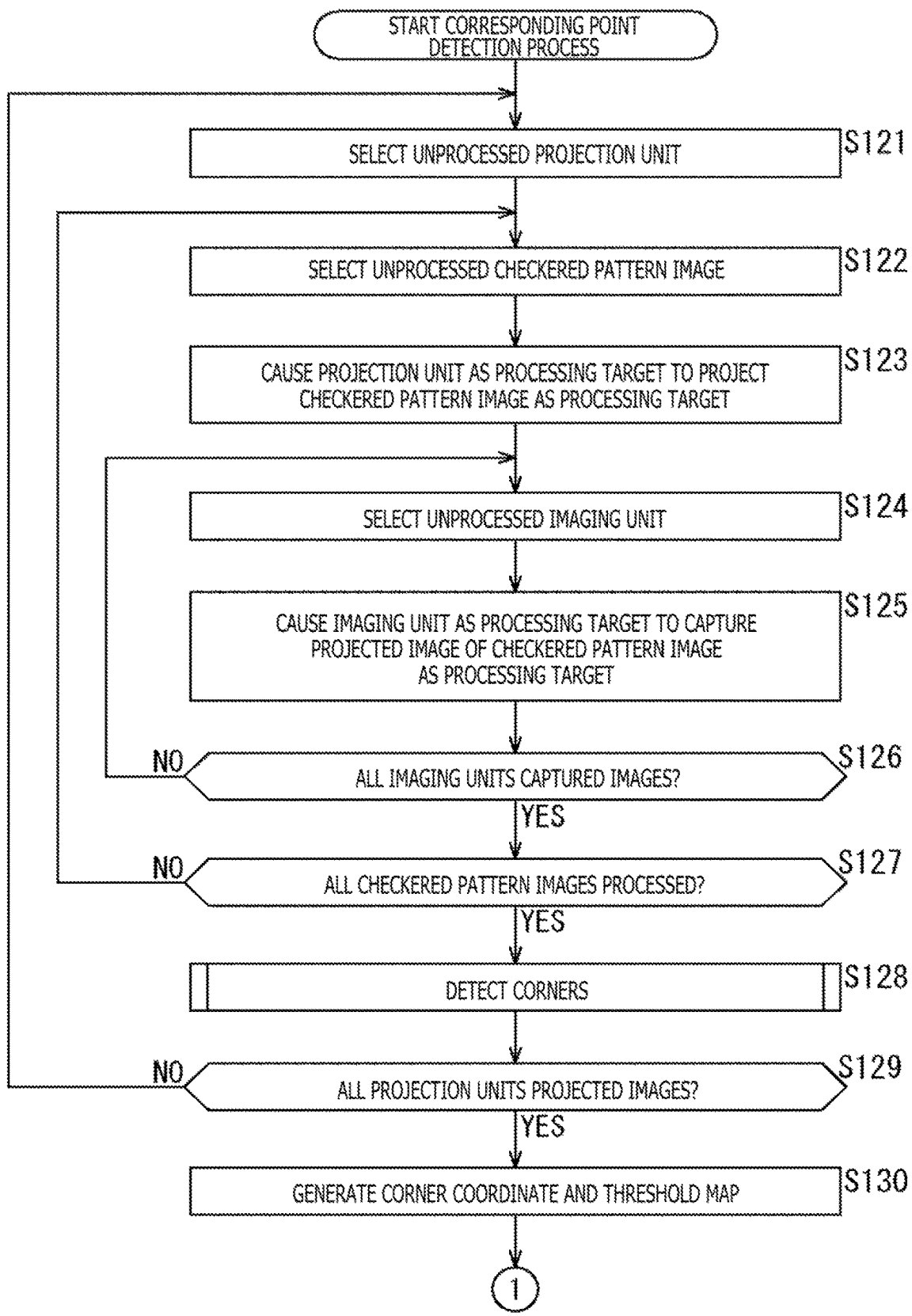
FIG. 16 is a flow chart describing an example of a flow of a corresponding point detection process.

When the process of step S163 is finished, the process returns to FIG. 16.

<Flow of Center-of-Gravity Detection Process>

Figure 23:
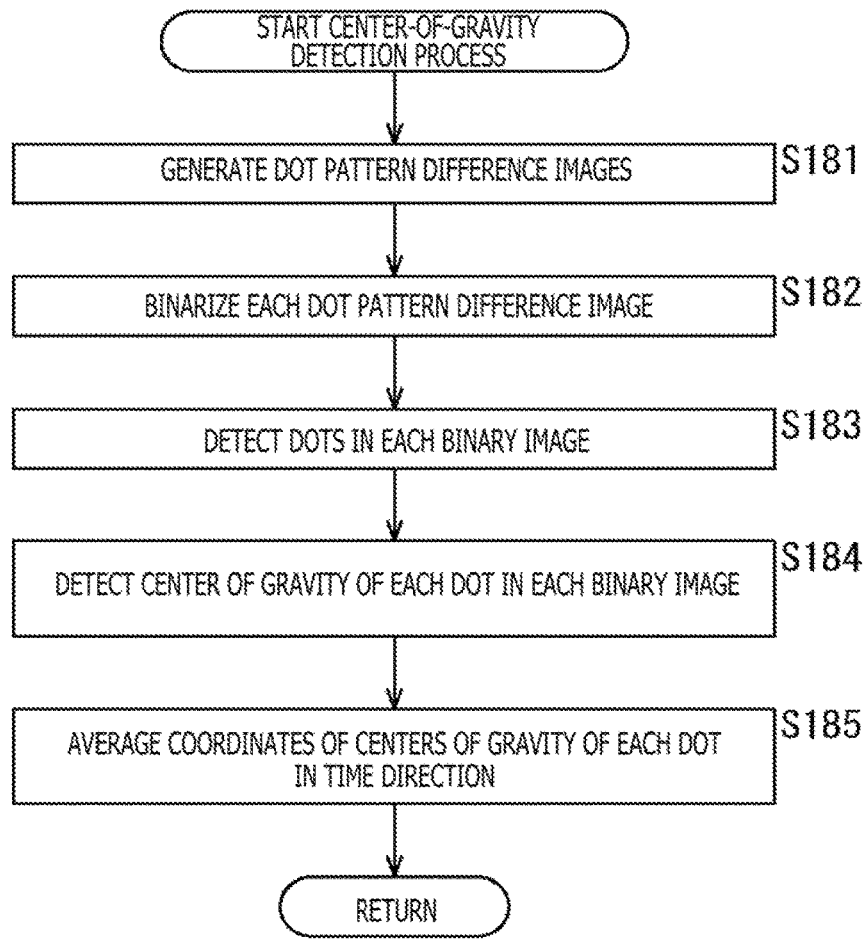
FIG. 23 is a flow chart describing an example of a flow of a center-of-gravity detection process.

Next, an example of a flow of the center-of-gravity detection process executed in step S148 of FIG. 17 will be described with reference to a flow chart of FIG. 23.

Once the center-of-gravity detection process is started, the difference image generation unit 171 in step S181 generates dot pattern difference images that are difference images between the captured images including the projected images of the pair of dot pattern images obtained in step S145 and the captured image including the projected image of the image not including the dot pattern. For example, in the case of FIG. 20, the difference image generation unit 171 generates a dot pattern difference image between the captured image including the dot pattern image 311-0 and the captured image including the dot pattern image 311-1, a dot pattern difference image between the captured image including the dot pattern image 311-0 and the captured image including the dot pattern image 311-2, and a dot pattern difference image between the captured image including the dot pattern image 311-0 and the captured image including the dot pattern image 311-3.

In step S182, the binarization unit 172 binarizes each dot pattern difference image obtained in step S181 to obtain each binary image. The dots become more prominent by binarizing the dot pattern difference images, and the dot detection can be further facilitated.

In step S183, the dot detection unit 173 detects dots in each binary image obtained in step S182. In this case, the dot detection unit 173 may detect the dot corresponding to the corner in a predetermined range including the corner (feature point) detected in step S128 (FIG. 16).

Figure 24:
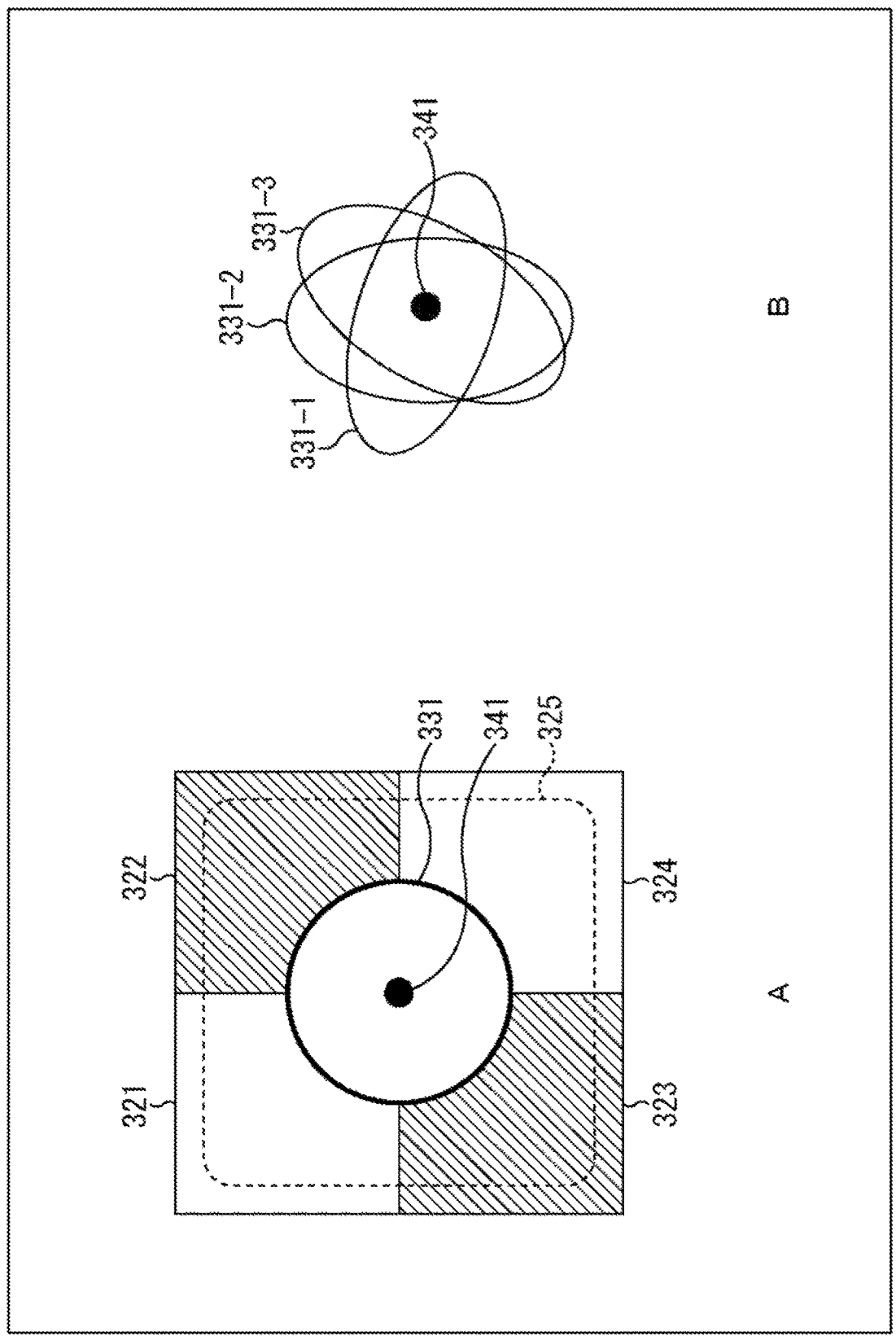
FIG. 24 is a diagram describing an example of a situation of center-of-gravity detection.

For example, in a case of detecting a dot 331 corresponding to the corner of rectangles 321 to 324 adjacent to each other as illustrated in A of FIG. 24, the dot detection unit 173 may detect the dot in a predetermined range 325 including the corner.

The dot is set at the position of each corner, and the dot corresponding to each corner appears near the corner. In other words, a dot detected at a position away from the corner is likely to be false detection. Therefore, by detecting the dot corresponding to each corner in a predetermined range including the corner (for example, in a predetermined range around the corner), the false detection of the dot can be suppressed, and the dot corresponding to the corner can be more accurately detected. In addition, detection of dots in unnecessary areas can be suppressed, and unnecessary processing can be reduced. Therefore, an increase in the processing time or the load can be suppressed.

In step S184, the center-of-gravity detection unit 174 detects the center of gravity of each dot in each binary image detected in step S183. For example, in the case where the dot 331 is detected in step S183 as illustrated in A of FIG. 24, the center-of-gravity detection unit 174 obtains a center of gravity 341 of the dot 331. The center of gravity can be used to correct the position of the corner, and the corresponding point detection can be more accurately performed.

In step S185, the average processing unit 175 averages, in the time direction, coordinates of the centers of gravity of each dot detected in step S184. For example, as illustrated in B of FIG. 24, it is assumed that three dots including dots 331-1 to 331-3 are individually detected as dots corresponding to one corner in three captured images. The average processing unit 175 averages the coordinates of the centers of gravity of the dots 331-1 to 331-3 in the time direction. The center of gravity of the dot averaged in the time direction obtained in this way can be used to correct the position of the corner, and the corresponding point detection can be further accurately performed.

When the process of step S185 is finished, the process returns to FIG. 17.

By executing the processes as described above, the control apparatus 101 can improve the accuracy of the corresponding point detection.

3. Second Embodiment

<Other Configuration Examples of Projection Imaging System and Projection Imaging Apparatus>

Note that the configuration example of the projection imaging system according to the present technique is not limited to the example described above. For example, as in a projection imaging system 400 illustrated in A of FIG. 25, the control apparatus 101 and each projection imaging apparatus 102 may be connected to each other through a network 401.

The network 401 is an arbitrary communication network. The communication method adopted in the network 401 is arbitrary. For example, the communication may be wired communication, may be wireless communication, or may be both of them. In addition, the network 401 may include one communication network or may include a plurality of communication networks. For example, the network 401 may include communication networks and communication channels of arbitrary communication standards, such as the Internet, a public telephone network, a wide-area communication network for a wireless mobile in a so-called 3G network or 4G network, a wireless communication network for performing communication in compliance with WAN (Wide Area Network), LAN (Local Area Network), and Bluetooth (registered trademark) standards, a communication channel of short-range wireless communication like NFC (Near Field Communication), a communication channel of infrared communication, and a communication network of wired communication in compliance with HDMI (registered trademark) (High-Definition Multimedia Interface) and USB (Universal Serial Bus) standards.

The control apparatus 101 and each projection imaging apparatus 102 are connected to the network 401 and are capable of communication. Note that the connection may be wired (that is, connection through wired communication), may be wireless (that is, connection through wireless communication), or may be both of them. Note that the number of apparatuses, the shape and the size of the housing, the arrangement position, and the like are arbitrary.

The control apparatus 101 and each projection imaging apparatus 102 can communicate with each other (such as transfer of information) through the network 401. In other words, the control apparatus 101 and each projection imaging apparatus 102 may be connected and capable of communicating with each other through other equipment (such as an apparatus and a transmission path).

In the case of the projection imaging system 400 configured in this way, the present technique can be similarly applied as in the case of the projection imaging system 100, and the effects described above can be obtained.

Figure 25:
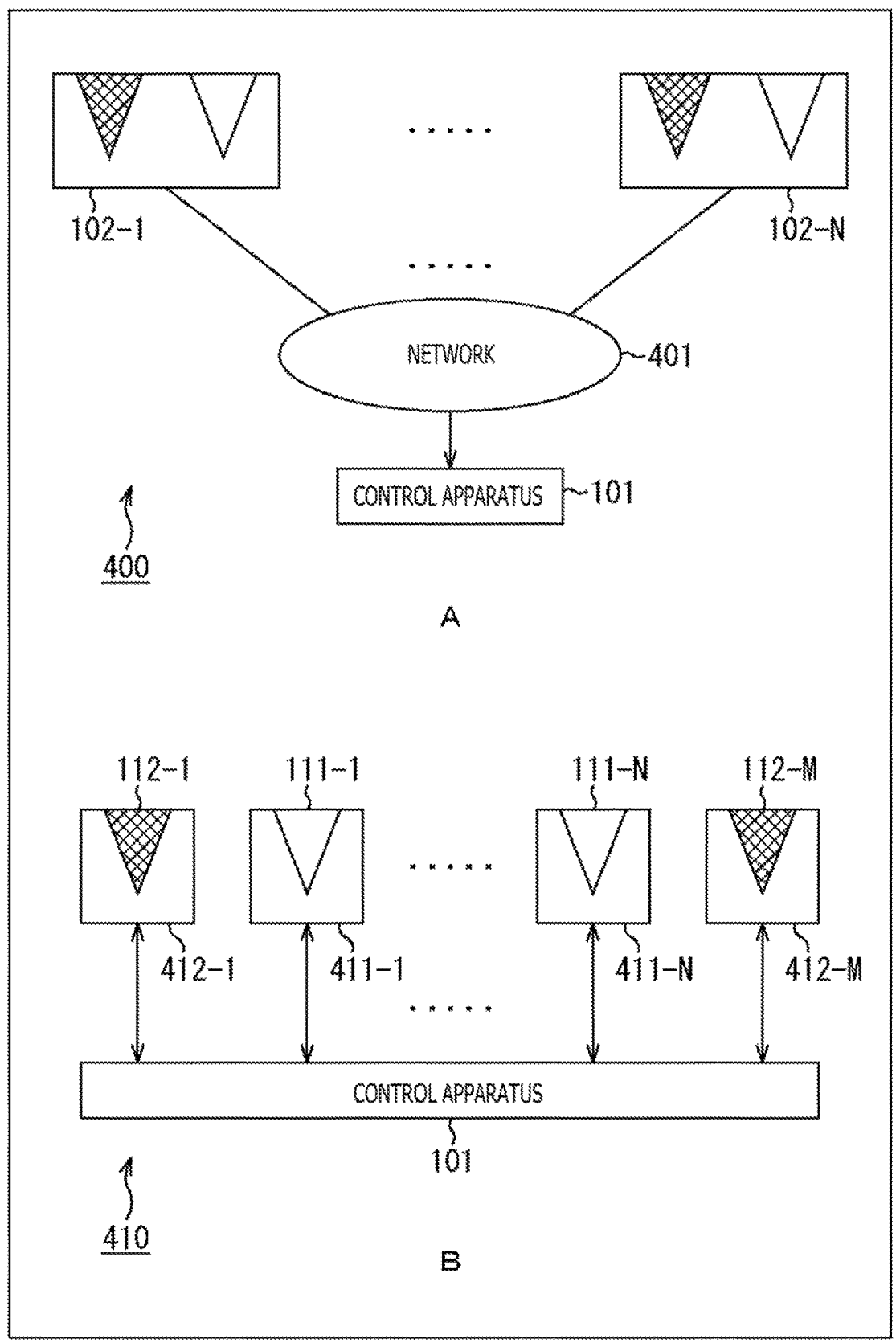
FIG. 25 is a block diagram illustrating another configuration example of the projection imaging system.

In addition, for example, the projection units 111 and the imaging units 112 may be provided as different apparatuses as in a projection imaging system 410 illustrated in B of FIG. 25. The projection imaging system 410 includes projection apparatuses 411-1 to 411-N (N is an arbitrary natural number) and imaging apparatuses 412-1 to 412-M (M is an arbitrary natural number) in place of the projection imaging apparatuses 102. The projection apparatuses 411-1 to 411-N include the projection units 111 (projection units 111-1 to 111-N), respectively, and project images. The imaging apparatuses 412-1 to 412-M include the imaging units 112 (imaging units 112-1 to 112-M), respectively, and take images of the projection surfaces (projected images projected by the projection units 111).

The projection apparatuses 411-1 to 411-N will be referred to as projection apparatuses 411 in a case where the distinction is not necessary in the description. The imaging apparatuses 412-1 to 412-M will be referred to as imaging apparatuses 412 in a case where the distinction is not necessary in the description.

Each projection apparatus 411 and each imaging apparatus 412 are connected to and capable of communicating with the control apparatus 101 and are capable of communicating with the control apparatus 101 (transferring information) through one of or both wired communication and wireless communication. Note that each projection apparatus 411 and each imaging apparatus 412 may be able to communicate with one of or both another projection apparatus 411 and another imaging apparatus 412 through the control apparatus 101.

In addition, the number of apparatuses, the shape and the size of the housing, the arrangement position, and the like are arbitrary. In addition, as in the example of A of FIG. 25, the apparatuses may be connected to and capable of communicating with each other through other equipment (apparatus or transmission path), such as the network 401.

In the case of the projection imaging system 410 configured in this way, the present technique can be similarly applied as in the case of the projection imaging system 100, and the effects described above can be obtained.

Figure 26:
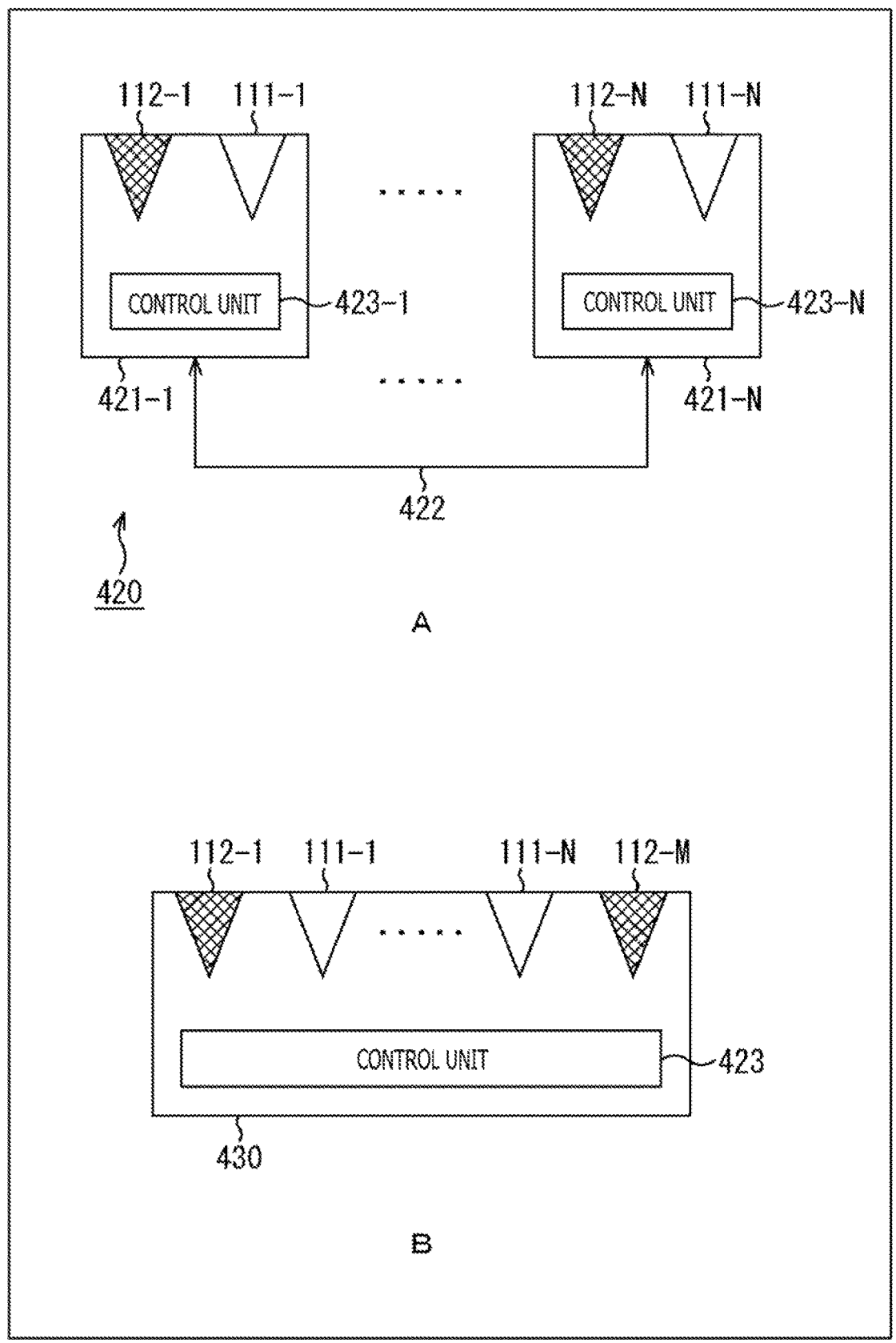
FIG. 26 is a block diagram illustrating main configuration examples of a projection imaging system and a projection imaging apparatus.

In addition, for example, the control apparatus 101 may be eliminated as in a projection imaging system 420 illustrated in A of FIG. 26. As illustrated in A of FIG. 26, the projection imaging system 420 includes projection imaging apparatuses 421-1 to 421-N(N is an arbitrary natural number). The projection imaging apparatuses 421-1 to 421-N will be referred to as projection imaging apparatuses 421 in a case where the distinction is not necessary in the description. The projection imaging apparatuses 421 are connected to and capable of communicating with each other through a communication cable 422. Note that the projection imaging apparatuses 421 may be connected to and capable of communicating with each other through wireless communication.

The projection imaging apparatuses 421-1 to 421-N include control units 423-1 to 423-N, respectively. The control units 423-1 to 423-N will be referred to as control units 423 in a case where the distinction is not necessary in the description. The control unit 423 has functions similar to the control apparatus 101 and can execute similar processes.

That is, in the case of the projection imaging system 420, the projection imaging apparatus 421 (the control unit 423 of the projection imaging apparatus 421) executes the processes executed by the control apparatus 101 described above. Note that one of the projection imaging apparatuses 421 (the control unit 423 of the projection imaging apparatus 421) may execute all the processes executed by the control apparatus 101, or a plurality of projection imaging apparatuses 421 (the control units 423 of the projection imaging apparatuses 421) may cooperate to execute the processes by performing operations, such as transfer of information to each other.

In the case of the projection imaging system 420 configured in this way, the present technique can be similarly applied as in the case of the projection imaging system 100, and the effects described above can be obtained.

Furthermore, as illustrated for example in B of FIG. 26, the projection imaging system 100 may be provided as one apparatus. A projection imaging apparatus 430 illustrated in B of FIG. 26 includes the projection units 111 (projection units 111-1 to 111-N (N is an arbitrary natural number)), the imaging units 112 (imaging units 112-1 to 112-M (M is an arbitrary natural number)), and the control unit 423.

In the projection imaging apparatus 430, the control unit 423 executes the processes executed by the control apparatus 101 to control each projection unit 111 and each imaging unit 112 to perform operations, such as detection of corresponding points.

Therefore, in the case of the projection imaging apparatus 430 configured in this way, the present technique can be similarly applied as in the case of the projection imaging system 100, and the effects described above can be obtained.

4. Etc.

<Application Examples of the Present Technique>

The systems and the apparatuses according to the embodiments described above can be applied to arbitrary systems and electronic devices. The present technique can also be applied to, for example, imaging processing systems and image processing apparatuses in arbitrary fields, such as traffic, medical care, crime prevention, agriculture, livestock industry, mining industry, cosmetics, factories, home appliances, weather, and natural surveillance.

For example, the present technique can also be applied to a system that projects and captures an image to be viewed. The present technique can also be applied to, for example, a system used for traffic. Furthermore, the present technique can be applied to, for example, a system used for security. The present technique can also be applied to, for example, a system used for sports. Furthermore, the present technique can be applied to, for example, a system used for agriculture. The present technique can also be applied to, for example, a system used for livestock industry. Furthermore, the present technique can be applied to, for example, a system that monitors the state of the nature, such as volcanos, forests, and oceans, a weather observation system that observes, for example, the weather, temperature, humidity, wind velocity, sunshine hours, and the like, a system that observes ecology of the wild life, such as birds, fish, reptiles, amphibians, mammals, insects, and plants, and the like.

<Software>

The series of processes described above can be executed by hardware or can be executed by software. In the case where the series of processes described above are executed by software, a program included in the software is installed from a network or a recording medium.

For example, in the case of the control apparatus 101 of FIG. 9, the recording medium includes the removable medium 141 recording the program, the removable medium 141 distributed separately from the main body of the apparatus to deliver the program to the user. In this case, for example, the removable medium 141 can be mounted on the drive 135 to cause the drive 135 to read the program stored in the removable medium 141 and install the program on the storage unit 133.

In addition, in the case of, for example, the projection imaging apparatus 102 of FIG. 12, the recording medium includes the removable medium 221 recording the program, the removable medium 221 distributed separately from the main body of the apparatus to deliver the program to the user. In this case, for example, the removable medium 221 can be mounted on the drive 215 to cause the drive 215 to read the program stored in the removable medium 221 to install the program on the storage unit 213.

The program can also be provided through a wired or wireless transmission medium, such as a local area network, the Internet, and digital satellite broadcasting. For example, in the case of the control apparatus 101 of FIG. 9, the communication unit 134 can receive the program, and the program can be installed on the storage unit 133. In addition, in the case of, for example, the projection imaging apparatus 102 of FIG. 12, the communication unit 214 can receive the program, and the program can be installed on the storage unit 213.

Additionally, the program can also be installed in advance in a storage unit, a ROM, or the like. For example, in the case of the control apparatus 101 of FIG. 9, the program can be installed in advance in the storage unit 133, the ROM 122, or the like. In addition, in the case of, for example, the projection imaging apparatus 102 of FIG. 12, the program can be installed in advance in the storage unit 213, a ROM (not illustrated) included in the control unit 201, or the like.

Note that the program executed by the computer may be a program in which the processes of the steps describing the program are executed in chronological order described in the present specification, or the program may be a program for executing the processes in parallel or for executing the processes separately at a necessary timing such as when the processes are invoked. Furthermore, the processes of the steps describing the program may be executed in parallel with processes of other programs or may be executed in combination with processes of other programs.

In addition, the processes of the steps described above can be executed by the apparatuses described above or by arbitrary apparatuses other than the apparatuses described above. In that case, the apparatus that executes the process can have the functions (such as functional blocks) described above necessary to execute the process. In addition, information necessary for the process can be appropriately transmitted to the apparatus.

<Etc.>

The embodiments of the present technique are not limited to the embodiments described above, and various changes can be made without departing from the scope of the present technique.

For example, the system in the present specification denotes a set of a plurality of constituent elements (apparatuses, modules (components), and the like), and whether or not all of the constituent elements are in the same housing does not matter. Therefore, a plurality of apparatuses stored in separate housings and connected through a network and one apparatus storing a plurality of modules in one housing are both systems.

Furthermore, for example, the configuration of one apparatus (or processing unit) in the description may be divided to provide a plurality of apparatuses (or processing units). Conversely, the configurations of a plurality of apparatuses (or processing units) described above may be put together to provide one apparatus (or processing unit). In addition, configurations other than the configurations described above may be obviously added to the configuration of each apparatus (or each processing unit). Furthermore, part of the configuration of an apparatus (or processing unit) may be included in the configuration of another apparatus (or another processing unit) as long as the configuration and the operation of the entire system are substantially the same.

In addition, the present technique can be provided as, for example, cloud computing in which a plurality of apparatuses share one function and cooperate to execute a process through a network.

In addition, for example, one apparatus can execute each step described in the flow charts, or a plurality of apparatuses can take charge and execute each step. Furthermore, in the case where one step includes a plurality of processes, one apparatus can execute the plurality of processes included in one step, or a plurality of apparatuses can take charge and execute the processes.

In addition, the present technique can be carried out not only as an apparatus or a system, but can also be carried out in any configuration mounted on an apparatus included in the apparatus or the system, such as, for example, a processor as system LSI (Large Scale Integration) or the like, a module using a plurality of processors or the like, a unit using a plurality of modules or the like, and a set including other functions added to the unit (that is, configuration of part of an apparatus).

Note that the plurality of present techniques described in the present specification can be independently and separately carried out as long as there is no contradiction. Obviously, a plurality of arbitrary present techniques can also be combined and carried out. For example, the present technique described in one of the embodiments can also be carried out in combination with the present technique described in another embodiment. In addition, an arbitrary present technique described above can also be carried out in combination with another technique not described above.

Note that the present technique can also be configured as follows.

(1)

An image processing apparatus including:

a feature point detection unit that detects a plurality of predetermined feature points included in a captured image obtained by capturing a projected image including the feature points;

a dot detection unit that detects a single or a plurality of dots included in a captured image obtained by capturing a projected image including a dot pattern including the dots; and a corresponding point detection unit that detects corresponding points between the projected image and the captured image by identifying the feature points detected by the feature point detection unit on the basis of an appearance pattern of the dots in a time direction detected by the dot detection unit and corresponding to the feature points.

(2)

The image processing apparatus according to (1), in which the corresponding point detection unit identifies the feature points on the basis of an appearance pattern of the dots in the time direction detected by the dot detection unit and positioned at the same positions as or around the feature points detected by the feature point detection unit.

(3)

The image processing apparatus according to (1) or (2), in which the projected image including the feature points is a projected image of a checkered pattern, and the feature points are corners of the checkered pattern.

(4)

The image processing apparatus according to any one of (1) to (3), in which the feature point detection unit generates a difference image between a pair of captured images obtained by capturing projected images of a pair of checkered patterns with reversed patterns and detects the feature points included in the generated difference image.

(5)
The image processing apparatus according to any one of (1) to (4), in which
the feature point detection unit binarizes the difference image to generate a binary image and detects the feature points included in the generated binary image.

(6)
The image processing apparatus according to any one of (1) to (5), in which
the feature point detection unit generates map information of coordinates of the detected feature points.

(7)
The image processing apparatus according to any one of (1) to (6), in which
the dot detection unit detects the dots included in each captured image obtained by capturing the projected image of each of a plurality of dot patterns provided with the dots arranged such that appearance patterns of the dots in the time direction sequentially projected in the time direction and corresponding to the feature points are uniquely determined.

(8)
The image processing apparatus according to any one of (1) to (7), in which
the dot detection unit detects the dots in predetermined ranges including the feature points.

(9)
The image processing apparatus according to any one of (1) to (8), in which
the dot detection unit generates a difference image between a captured image obtained by capturing a projected image not including the dot pattern and a captured image obtained by capturing a projected image including the dot pattern and detects the dots included in the generated difference image.

(10)
The image processing apparatus according any one of (1) to (9), in which
the dot detection unit binarizes the difference image to generate a binary image and detects the dots included in the generated binary image.

(11)
The image processing apparatus according to any one of (1) to (10), in which
the dot detection unit further detects centers of gravity of the detected dots, and
the corresponding point detection unit uses the centers of gravity of the dots detected by the dot detection unit to correct the positions of the feature points.

(12)
The image processing apparatus according to any one of (1) to (11), in which
the dot detection unit
detects the dots and the centers of gravity of the dots included in each captured image obtained by capturing the projected image of each of the plurality of dot patterns provided with the dots arranged such that the appearance patterns of the dots in the time direction sequentially projected in the time direction and corresponding to the feature points are uniquely determined and
averages, in the time direction, the detected centers of gravity of the dots corresponding to the same feature points.

(13)
The image processing apparatus according to any one of (1) to (12), in which
the dot pattern is provided with the dots in a pattern such that a frequency of appearance of the dot in the time direction corresponding to the feature point in a peripheral section of the projected image is higher than a frequency of appearance of the dot in the time direction corresponding to the feature point at a position other than the peripheral section of the projected image.

(14)
The image processing apparatus according to any one of (1) to (13), in which
the feature points are parts of predetermined pictures included in a pattern image in which pictures in a predetermined pattern are repeated,
the feature point detection unit is configured to detect the feature points included in a captured image obtained by capturing a projected image including the pattern image superimposed on another image, and
the dot detection unit is configured to detect the dots included in a captured image obtained by capturing a projected image including the dot pattern superimposed on another image.

(15) The image processing apparatus according to any one of (1) to (14), in which
the corresponding point detection unit detects corresponding points between each projected image projected from a plurality of projection units and each captured image obtained by a plurality of imaging units by capturing each projected image.

(16)
The image processing apparatus according to any one of (1) to (15), further including:
an orientation estimation unit that uses the corresponding points detected by the corresponding point detection unit to estimate an orientation.

(17)
The image processing apparatus according to any one of (1) to (16), further including:
a setting unit that performs setting regarding geometric correction of the projected image on the basis of the orientation estimated by the orientation estimation unit.

(18)
The image processing apparatus according to any one of (1) to (17), further including:
a projection unit that projects the projected image.

(19)
The image processing apparatus according to any one of (1) to (18), further including:
an imaging unit that captures the projected image to obtain the captured image.

(20)
An image processing method including:
detecting a plurality of predetermined feature points included in a captured image obtained by capturing a projected image including the feature points;
detecting a single or a plurality of dots included in a captured image obtained by capturing a projected image including a dot pattern including the dots; and
detecting corresponding points between the projected image and the captured image by identifying the detected feature points on the basis of an appearance pattern of the detected dots in a time direction corresponding to the feature points.

REFERENCE SIGNS LIST

100 Projection imaging system, 101 Control apparatus, 102 Projection imaging apparatus, 111 Projection unit, 112

Imaging unit, 151 Checkered pattern projection imaging unit, 152 Corner detection unit, 153 Dot pattern projection imaging unit, 154 Dot center-of-gravity detection unit, 155 Corresponding point decoding unit, 156 Orientation estimation unit, 157 Setting unit, 158 Projection control unit, 159 Imaging control unit, 161 Difference image generation unit, 162 Binarization unit, 163 Corner detection unit, 171 Difference image generation unit, 172 Binarization unit, 173 Dot detection unit, 174 Center-of-gravity detection unit, 175 Average processing unit, 201 Control unit, 400 Projection imaging system, 401 Network, 410 Projection imaging system, 411 Projection apparatus, 412 Imaging apparatus, 420 Projection imaging system, 421 Projection imaging apparatus, 423 Control unit, 430 Projection imaging apparatus

The invention claimed is:

1. An image processing apparatus comprising:
  circuitry configured to:
    detect a plurality of predetermined feature points included in a plurality of captured images obtained by capturing a plurality of projected images of a plurality of checkered patterns, each checkered pattern including one or more of the feature points;
    detect each feature point corresponding to a single detected dot or a plurality of detected dots included in a respective captured image of the plurality of captured images obtained by capturing a respective projected image of the plurality of projected images including a respective checkered pattern of the plurality of checkered patterns as a dot pattern; and
    detect corresponding points between each respective projected image of the plurality of projected images and the respective captured image of the plurality of captured images by identifying the detected feature points based on an appearance pattern of each detected dot at a same position over time between the plurality of checkered patterns,
  wherein the appearance pattern of each respective detected dot is determined according to a respective frequency of appearance of the respective detected dot in the plurality of checkered patterns, and
  wherein the plurality of checkered patterns are different from one another with respect to the appearance of at least one detected dot.

2. The image processing apparatus according to claim 1, wherein
  the circuitry identifies the feature points based on the appearance pattern of each detected dot over time that is positioned at same positions as or around the detected feature points.

3. The image processing apparatus according to claim 1, wherein
  the feature points are corners of the checkered pattern.

4. The image processing apparatus according to claim 1, wherein
  the circuitry generates a difference image between a pair of captured images obtained by capturing a pair of projected images of a pair of different checkered patterns among the plurality of checkered patterns with reversed patterns and detects the feature points included in the generated difference image.

5. The image processing apparatus according to claim 4, wherein
  the circuitry binarizes the difference image to generate a binary image and detects the feature points included in the generated binary image.

6. The image processing apparatus according to claim 1, wherein
  the circuitry generates map information of coordinates of the detected feature points.

7. The image processing apparatus according to claim 1, wherein
  the circuitry detects the dots included in each captured image obtained by capturing the projected image of each of a plurality of dot patterns provided with the dots arranged such that appearance patterns of the dots in the time direction sequentially projected in the time direction and corresponding to the feature points are uniquely determined.

8. The image processing apparatus according to claim 1, wherein
  the circuitry detects the dots in predetermined ranges including the feature points.

9. The image processing apparatus according to claim 1, wherein
  the circuitry generates a difference image between a captured image obtained by capturing a projected image not including the dot pattern and a captured image obtained by capturing a projected image including the dot pattern and detects the dots included in the generated difference image.

10. The image processing apparatus according to claim 9, wherein
  the circuitry binarizes the difference image to generate a binary image and detects the dots included in the generated binary image.

11. The image processing apparatus according to claim 1, wherein
  the circuitry further detects centers of the detected dots, and
  the corresponding point detection unit uses the centers of the detected dots to correct the positions of the feature points.

12. The image processing apparatus according to claim 11, wherein
  the circuitry
    detects the dots and the centers of the dots included in each captured image obtained by capturing the projected image of each of the plurality of dot patterns provided with the dots arranged such that the appearance patterns of the dots in the time direction sequentially projected in the time direction and corresponding to the feature points are uniquely determined, and
    averages, in the time direction, the detected centers of the dots corresponding to same feature points.

13. The image processing apparatus according to claim 12, wherein
  the dot pattern is provided with the dots in a pattern such that the frequency of appearance of the dot in the time direction corresponding to the feature point in a peripheral section of the projected image is higher than the frequency of appearance of the dot in the time direction corresponding to the feature point at a position other than the peripheral section of the projected image.

14. The image processing apparatus according to claim 1, wherein
  the feature points are parts of predetermined pictures included in a pattern image in which pictures in a predetermined pattern are repeated,
  the circuitry is configured to detect the feature points included in the captured image obtained by capturing the projected image including the pattern image superimposed on another image, and the circuitry is configured to detect the dots included in the captured image obtained by capturing the projected image including the dot pattern superimposed on another image.

15. The image processing apparatus according to claim 1, wherein the circuitry detects corresponding points between each projected image projected from a plurality of projectors and each captured image obtained by a plurality of cameras by capturing each projected image.

16. The image processing apparatus according to claim 1, wherein the circuitry is further configured to use the detected corresponding points to estimate an orientation.

17. The image processing apparatus according to claim 16, wherein the circuitry is further configured to perform setting including geometric correction of the projected image based on the estimated orientation.

18. The image processing apparatus according to claim 1, further comprising:

a projector configured to project the projected image.

19. The image processing apparatus according to claim 1, further comprising:

a camera configured to capture the projected image to obtain the captured image.

20. An image processing method, executed via at least one processor, the method comprising:

detecting a plurality of predetermined feature points included in a plurality of captured images obtained by capturing a plurality of projected images of a plurality of checkered patterns, each checkered pattern including one or more of the feature points;

detecting each feature point corresponding to a single detected dot or a plurality of detected dots included in a respective captured image obtained by capturing a respective projected image including a dot pattern; and detecting corresponding points between each respective projected image of the plurality of projected images and the respective captured image of the plurality of captured images by identifying the detected feature points based on an appearance pattern of each detected dot at a same position over time between the plurality of checkered patterns, wherein the appearance pattern of each respective detected dot is determined according to a respective frequency of appearance of the respective detected dot in the plurality of checkered patterns, and wherein the plurality of checkered patterns are different from one another with respect to the appearance of at least one detected dot.

21. The image processing apparatus according to claim 1, wherein the appearance pattern of each detected dot over time is determined with respect to a set of dot patterns that are projected sequentially.

22. The image processing apparatus according to claim 1, wherein the respective frequency of the appearance of the respective detected dot indicates a combination of different checkered patterns among the plurality of checkered patterns that include the respective detected dot.

* * * * *